US011901817B2

United States Patent
Low et al.

(10) Patent No.: US 11,901,817 B2
(45) Date of Patent: Feb. 13, 2024

(54) PROTECTION OF SWITCHED CAPACITOR POWER CONVERTER

(71) Applicant: pSemi Corporation, San Diego, CA (US)

(72) Inventors: Aichen Low, Cambridge, MA (US); David M. Giuliano, Brookline, MA (US); Gregory Szczeszynski, Hollis, NH (US); Jeff Summit, Jefferson, MA (US); Oscar Blyde, Melrose, MA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 18/348,924

(22) Filed: Jul. 7, 2023

(65) Prior Publication Data

US 2024/0014735 A1 Jan. 11, 2024

Related U.S. Application Data

(60) Continuation of application No. 17/163,323, filed on Jan. 29, 2021, which is a division of application No.
(Continued)

(51) Int. Cl.
*H02M 3/07* (2006.01)
*H02M 1/32* (2007.01)

(52) U.S. Cl.
CPC ............ *H02M 3/07* (2013.01); *H02M 1/32* (2013.01); *H02M 3/073* (2013.01); *H02M 3/075* (2021.05)

(58) Field of Classification Search
CPC ........ H02M 3/07; H02M 3/073; H02M 3/075; H02M 1/32
See application file for complete search history.

(56) References Cited

U.S. PATENT DOCUMENTS

| 3,370,215 A | 2/1968 | Light, Jr. |
| 3,745,437 A | 7/1973 | Brown |

(Continued)

FOREIGN PATENT DOCUMENTS

| CN | 1057410 A | 1/1992 |
| CN | 1132959 A | 10/1996 |

(Continued)

OTHER PUBLICATIONS

Ng, Vincent Wai-Shan et al., Switched Capacitor DC-DC Converter: Superior Where the Buck Converter has Dominated, Electrical Engineering and Computer Sciences, University of California at Berkeley, Aug. 17, 2011, 128 pages.

(Continued)

*Primary Examiner* — Nguyen Tran
(74) *Attorney, Agent, or Firm* — Finnegan, Henderson, Farabow Garrett & Dunner LLP

(57) ABSTRACT

Transient or fault conditions for a switched capacitor power converter are detected by measuring one or more of internal voltages and/or currents associated with switching elements (e.g., transistors) or phase nodes, or voltages or currents at terminals of the converter, and based on these measurements detect that a condition has occurred when the measurements deviate from a predetermined range. Upon detection of the condition fault control circuitry alters operation of the converter, for example, by using a high voltage switch to electrically disconnect at least some of the switching elements from one or more terminals of the converter, or by altering timing characteristics of the phase signals.

30 Claims, 14 Drawing Sheets

Related U.S. Application Data

16/850,991, filed on Apr. 16, 2020, now Pat. No. 10,938,299, which is a continuation of application No. 15/719,929, filed on Sep. 29, 2017, now Pat. No. 10,666,134, which is a continuation of application No. 14/776,939, filed as application No. PCT/US2013/078243 on Dec. 30, 2013, now Pat. No. 9,847,712, which is a continuation of application No. 13/838,681, filed on Mar. 15, 2013, now Pat. No. 8,619,445.

(56) References Cited

U.S. PATENT DOCUMENTS

| | | |
|---|---|---|
| 3,818,306 A | 6/1974 | Marini |
| 3,818,360 A | 6/1974 | Boutmy et al. |
| 4,214,174 A | 7/1980 | Dickson |
| 4,408,268 A | 10/1983 | Peters et al. |
| 4,415,959 A | 11/1983 | Vinciarelli |
| 4,513,364 A | 4/1985 | Nilssen |
| 4,604,584 A | 8/1986 | Kelley |
| 4,713,742 A | 12/1987 | Parsley |
| 4,812,961 A | 3/1989 | Essaff et al. |
| 4,903,181 A | 2/1990 | Seidel |
| 5,006,782 A | 4/1991 | Pelly |
| 5,057,986 A | 10/1991 | Henze et al. |
| 5,119,283 A | 6/1992 | Steigerwald et al. |
| 5,132,606 A | 7/1992 | Herbert |
| 5,132,895 A | 7/1992 | Kase |
| 5,159,539 A | 10/1992 | Koyama |
| 5,198,970 A | 3/1993 | Kawabata et al. |
| 5,268,832 A | 12/1993 | Kandatsu |
| 5,301,097 A | 4/1994 | McDaniel |
| 5,331,303 A | 7/1994 | Shiota |
| 5,345,376 A | 9/1994 | Nourbakhsh |
| 5,402,329 A | 3/1995 | Wittenbreder, Jr. |
| 5,548,206 A | 8/1996 | Soo |
| 5,557,193 A | 9/1996 | Kajimoto |
| 5,563,779 A | 10/1996 | Cave et al. |
| 5,581,454 A | 12/1996 | Collins |
| 5,602,794 A | 2/1997 | Javanifard et al. |
| 5,610,807 A | 3/1997 | Kanda et al. |
| 5,661,348 A | 8/1997 | Brown |
| 5,717,581 A | 2/1998 | Canclini |
| 5,737,201 A | 4/1998 | Meynard et al. |
| 5,761,058 A | 6/1998 | Kanda et al. |
| 5,793,626 A | 8/1998 | Jiang |
| 5,801,987 A | 9/1998 | Dinh |
| 5,812,017 A | 9/1998 | Golla et al. |
| 5,831,846 A | 11/1998 | Jiang |
| 5,892,395 A | 4/1999 | Stengel et al. |
| 5,907,484 A | 5/1999 | Kowshik et al. |
| 5,956,243 A | 9/1999 | Mao |
| 5,959,565 A | 9/1999 | Taniuchi et al. |
| 5,959,585 A | 9/1999 | Militz |
| 5,978,283 A | 11/1999 | Hsu et al. |
| 5,982,645 A | 11/1999 | Levran et al. |
| 5,991,169 A | 11/1999 | Kooken |
| 6,021,056 A | 2/2000 | Forbes et al. |
| 6,055,168 A | 4/2000 | Kotowski et al. |
| 6,084,789 A | 7/2000 | Van Lieshout |
| 6,107,864 A | 8/2000 | Fukushima et al. |
| 6,133,788 A | 10/2000 | Dent |
| 6,140,807 A | 10/2000 | Vannatta et al. |
| 6,154,380 A | 11/2000 | Assow et al. |
| 6,157,253 A | 12/2000 | Sigmon et al. |
| 6,169,457 B1 | 1/2001 | Ichimaru |
| 6,169,673 B1 | 1/2001 | McIntyre et al. |
| 6,178,102 B1 | 1/2001 | Stanley |
| 6,198,645 B1 | 3/2001 | Kotowski et al. |
| 6,255,896 B1 | 7/2001 | Li et al. |
| 6,255,906 B1 | 7/2001 | Eidson et al. |
| 6,275,018 B1 | 8/2001 | Telefus et al. |
| 6,316,956 B1 | 11/2001 | Oglesbee |
| 6,327,462 B1 | 12/2001 | Loke et al. |
| 6,329,796 B1 | 12/2001 | Popescu |
| 6,339,538 B1 | 1/2002 | Handleman |
| 6,362,986 B1 | 3/2002 | Schultz et al. |
| 6,377,117 B2 | 4/2002 | Oskowsky et al. |
| 6,396,341 B1 | 5/2002 | Pehlke |
| 6,400,579 B2 | 6/2002 | Cuk |
| 6,429,632 B1 | 8/2002 | Forbes et al. |
| 6,456,153 B2 | 9/2002 | Buck et al. |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,507,503 B2 | 1/2003 | Norrga |
| 6,515,612 B1 | 2/2003 | Abel |
| 6,563,235 B1 | 5/2003 | McIntyre et al. |
| 6,597,235 B2 | 7/2003 | Choi |
| 6,617,832 B1 | 9/2003 | Kobayashi |
| 6,650,552 B2 | 11/2003 | Takagi et al. |
| 6,657,876 B2 | 12/2003 | Satoh |
| 6,700,803 B2 | 3/2004 | Krein |
| 6,738,277 B2 | 5/2004 | Odell |
| 6,738,432 B2 | 5/2004 | Pehlke et al. |
| 6,759,766 B2 | 7/2004 | Hiratsuka iratsu et al. |
| 6,791,298 B2 | 9/2004 | Shenai et al. |
| 6,798,177 B1 | 9/2004 | Liu et al. |
| 6,906,567 B2 | 6/2005 | Culler |
| 6,927,441 B2 | 8/2005 | Pappalardo et al. |
| 6,934,167 B2 | 8/2005 | Jang et al. |
| 6,980,045 B1 | 12/2005 | Liu |
| 6,980,181 B2 | 12/2005 | Sudo |
| 6,995,995 B2 | 2/2006 | Zeng et al. |
| 7,009,858 B2 | 3/2006 | Umeda et al. |
| 7,071,660 B2 | 7/2006 | Xu et al. |
| 7,072,195 B2 | 7/2006 | Xu |
| 7,091,778 B2 | 8/2006 | Gan et al. |
| 7,103,114 B1 | 9/2006 | Lapierre |
| 7,135,847 B2 | 11/2006 | Taurand |
| 7,145,382 B2 | 12/2006 | Ker et al. |
| 7,157,956 B2 | 1/2007 | Wei |
| 7,161,816 B2 | 1/2007 | Shteynberg et al. |
| 7,190,210 B2 | 3/2007 | Azrai et al. |
| 7,224,062 B2 | 5/2007 | Hsu |
| 7,236,542 B2 | 6/2007 | Matero |
| 7,239,194 B2 | 7/2007 | Azrai et al. |
| 7,250,810 B1 | 7/2007 | Tsen |
| 7,259,974 B2 | 8/2007 | Donaldson et al. |
| 7,269,036 B2 | 9/2007 | Deng et al. |
| 7,330,070 B2 | 2/2008 | Väisänen |
| 7,362,251 B2 | 4/2008 | Jensen et al. |
| 7,365,523 B2 | 4/2008 | Malherbe et al. |
| 7,375,992 B2 | 5/2008 | Mok et al. |
| 7,382,113 B2 | 6/2008 | Wai et al. |
| 7,382,634 B2 | 6/2008 | Buchmann |
| 7,397,677 B1 | 7/2008 | Collins et al. |
| 7,400,118 B1 | 7/2008 | Zhang et al. |
| 7,408,330 B1 | 8/2008 | Zhao |
| 7,436,239 B2 | 10/2008 | Masuko et al. |
| 7,443,705 B2 | 10/2008 | Ito |
| 7,511,978 B2 | 3/2009 | Chen et al. |
| 7,521,914 B2 | 4/2009 | Dickerson et al. |
| 7,535,133 B2 | 5/2009 | Perreault et al. |
| 7,545,127 B2 | 6/2009 | Takahashi et al. |
| 7,589,605 B2 | 9/2009 | Perreault et al. |
| 7,595,682 B2 | 9/2009 | Lin et al. |
| 7,595,683 B1 | 9/2009 | Floyd |
| 7,616,467 B2 | 11/2009 | Mallwitz |
| 7,633,778 B2 | 12/2009 | Mok et al. |
| 7,642,797 B2 | 1/2010 | Kojima et al. |
| 7,656,740 B2 | 2/2010 | Yu et al. |
| 7,659,760 B2 | 2/2010 | Doi |
| 7,679,429 B2 | 3/2010 | Nakamura |
| 7,679,430 B2 | 3/2010 | Fort et al. |
| 7,696,735 B2 | 4/2010 | Oraw et al. |
| 7,705,672 B1 | 4/2010 | Rodriguez |
| 7,705,681 B2 | 4/2010 | Ilkov |
| 7,724,551 B2 | 5/2010 | Yanagida et al. |
| 7,746,041 B2 | 6/2010 | Xu et al. |
| 7,768,800 B2 | 8/2010 | Mazumder et al. |
| 7,777,459 B2 | 8/2010 | Williams |

(56) References Cited

U.S. PATENT DOCUMENTS

| | | |
|---|---|---|
| 7,782,027 B2 | 8/2010 | Williams |
| 7,786,712 B2 | 8/2010 | Williams |
| 7,807,499 B2 | 10/2010 | Nishizawa |
| 7,808,324 B1 | 10/2010 | Woodford et al. |
| 7,812,579 B2 | 10/2010 | Williams |
| 7,889,519 B2 | 2/2011 | Perreault et al. |
| 7,907,429 B2 | 3/2011 | Ramadass et al. |
| 7,907,430 B2 | 3/2011 | Kularatna et al. |
| 7,928,705 B2 | 4/2011 | Hooijschuur et al. |
| 7,940,038 B2 | 5/2011 | Da Silva et al. |
| 7,944,276 B2 | 5/2011 | Nakai |
| 7,952,418 B2 | 5/2011 | McDonald et al. |
| 7,956,572 B2 | 6/2011 | Zane et al. |
| 7,956,673 B2 | 6/2011 | Pan |
| 7,977,921 B2 | 7/2011 | Bahai et al. |
| 7,977,927 B2 | 7/2011 | Williams |
| 7,999,601 B2 | 8/2011 | Schlueter et al. |
| 8,000,117 B2 | 8/2011 | Petricek |
| 8,018,216 B2 | 9/2011 | Kakehi |
| 8,026,763 B2 | 9/2011 | Dawson et al. |
| 8,031,003 B2 | 10/2011 | Dishop |
| 8,035,148 B2 | 10/2011 | Goldstein |
| 8,040,174 B2 | 10/2011 | Likhterov |
| 8,048,766 B2 | 11/2011 | Joly et al. |
| 8,076,915 B2 | 12/2011 | Nakazawa |
| 8,085,524 B2 | 12/2011 | Roozeboom et al. |
| 8,089,788 B2 | 1/2012 | Jain |
| 8,102,157 B2 | 1/2012 | Abe |
| 8,106,597 B2 | 1/2012 | Mednik et al. |
| 8,111,052 B2 | 2/2012 | Glovinsky |
| 8,111,054 B2 | 2/2012 | Yen et al. |
| 8,130,518 B2 | 3/2012 | Fishman |
| 8,154,333 B2 | 4/2012 | Ker et al. |
| 8,159,091 B2 | 4/2012 | Yeates |
| 8,164,369 B2 | 4/2012 | Raghunathan et al. |
| 8,164,384 B2 | 4/2012 | Dawson et al. |
| 8,169,797 B2 | 5/2012 | Coccia et al. |
| 8,193,604 B2 | 6/2012 | Lin et al. |
| 8,212,541 B2 | 7/2012 | Perreault et al. |
| 8,248,045 B2 | 8/2012 | Shiu |
| 8,248,054 B2 | 8/2012 | Tong |
| 8,274,322 B2 | 9/2012 | Chang et al. |
| 8,276,002 B2 | 9/2012 | Dennard et al. |
| 8,330,436 B2 | 12/2012 | Oraw et al. |
| 8,339,102 B2 | 12/2012 | Kushnarenko et al. |
| 8,339,184 B2 | 12/2012 | Kok et al. |
| 8,350,549 B2 | 1/2013 | Kitabatake |
| 8,354,828 B2 | 1/2013 | Huang et al. |
| 8,384,467 B1 | 2/2013 | O'Keeffe et al. |
| 8,395,914 B2 | 3/2013 | Klootwijk et al. |
| 8,423,800 B2 | 4/2013 | Huang et al. |
| 8,436,674 B1 | 5/2013 | Standley et al. |
| 8,451,053 B2 | 5/2013 | Perreault et al. |
| 8,456,874 B2 | 6/2013 | Singer et al. |
| 8,503,203 B1 | 8/2013 | Szczeszynski et al. |
| 8,515,361 B2 | 8/2013 | Levesque et al. |
| 8,538,355 B2 | 9/2013 | Stockert |
| 8,542,061 B2 | 9/2013 | Levesque et al. |
| 8,542,169 B2 | 9/2013 | Senda |
| 8,559,898 B2 | 10/2013 | Jones et al. |
| 8,565,694 B2 | 10/2013 | Jones et al. |
| 8,571,492 B2 | 10/2013 | Berchtold et al. |
| 8,582,333 B2 | 11/2013 | Oraw et al. |
| 8,619,443 B2 | 12/2013 | Lumsden |
| 8,619,445 B1 | 12/2013 | Low et al. |
| 8,629,666 B2 | 1/2014 | Carroll et al. |
| 8,643,347 B2 | 2/2014 | Giuliano et al. |
| 8,659,353 B2 | 2/2014 | Dawson et al. |
| 8,670,254 B2 | 3/2014 | Perreault et al. |
| 8,674,545 B2 | 3/2014 | Signorelli et al. |
| 8,693,224 B1 | 4/2014 | Giuliano |
| 8,699,248 B2 | 4/2014 | Giuliano et al. |
| 8,699,973 B2 | 4/2014 | Southcombe et al. |
| 8,706,063 B2 | 4/2014 | Honjo et al. |
| 8,712,349 B2 | 4/2014 | Southcombe et al. |
| 8,718,188 B2 | 5/2014 | Balteanu et al. |
| 8,723,491 B2 | 5/2014 | Giuliano |
| 8,724,353 B1 | 5/2014 | Giuliano et al. |
| 8,729,819 B2 | 5/2014 | Zhao et al. |
| 8,731,498 B2 | 5/2014 | Southcombe et al. |
| 8,737,093 B1 | 5/2014 | Baker et al. |
| 8,743,553 B2 | 6/2014 | Giuliano |
| 8,750,539 B2 | 6/2014 | Pennock et al. |
| 8,760,219 B2 | 6/2014 | Chao |
| 8,803,492 B2 | 8/2014 | Liu |
| 8,811,920 B2 | 8/2014 | Deuchars et al. |
| 8,811,921 B2 | 8/2014 | Jones et al. |
| 8,817,501 B1 | 8/2014 | Low et al. |
| 8,824,978 B2 | 9/2014 | Briffa et al. |
| 8,829,993 B2 | 9/2014 | Briffa et al. |
| 8,830,709 B2 | 9/2014 | Perreault |
| 8,830,710 B2 | 9/2014 | Perreault et al. |
| 8,831,544 B2 | 9/2014 | Walker et al. |
| 8,842,399 B2 | 9/2014 | Jones et al. |
| 8,854,019 B1 | 10/2014 | Levesque et al. |
| 8,854,849 B2 | 10/2014 | Kobeda et al. |
| 8,856,562 B2 | 10/2014 | Huang et al. |
| 8,860,396 B2 | 10/2014 | Giuliano |
| 8,867,281 B2 | 10/2014 | Tran et al. |
| 8,874,828 B2 | 10/2014 | Fai et al. |
| 8,891,258 B2 | 11/2014 | Zhang et al. |
| 8,892,063 B2 | 11/2014 | Jones et al. |
| 8,913,967 B2 | 12/2014 | Zimlich et al. |
| 8,913,971 B2 | 12/2014 | Arkiszewski et al. |
| 8,942,650 B2 | 1/2015 | Southcombe et al. |
| 8,942,651 B2 | 1/2015 | Jones |
| 8,947,157 B2 | 2/2015 | Levesque et al. |
| 8,957,727 B2 | 2/2015 | Dawson et al. |
| 8,958,763 B2 | 2/2015 | Williams et al. |
| 8,981,836 B2 | 3/2015 | Kern et al. |
| 8,983,407 B2 | 3/2015 | Southcombe et al. |
| 8,983,409 B2 | 3/2015 | Ngo et al. |
| 8,983,410 B2 | 3/2015 | Southcombe et al. |
| 8,989,685 B2 | 3/2015 | Southcombe et al. |
| 9,008,597 B2 | 4/2015 | Levesque et al. |
| 9,030,256 B2 | 5/2015 | Jones et al. |
| 9,041,459 B2 | 5/2015 | Szczeszynski et al. |
| 9,048,787 B2 | 6/2015 | Jones et al. |
| 9,077,405 B2 | 7/2015 | Jones et al. |
| 9,143,032 B2 | 9/2015 | Le et al. |
| 9,143,037 B2 | 9/2015 | Giuliano |
| 9,184,701 B2 | 11/2015 | Berchtold et al. |
| 9,203,299 B2 | 12/2015 | Low et al. |
| 9,209,758 B2 | 12/2015 | Briffa et al. |
| 9,209,787 B2 | 12/2015 | Shelton et al. |
| 9,214,865 B2 | 12/2015 | Levesque et al. |
| 9,214,900 B2 | 12/2015 | Arkiszewski |
| 9,362,825 B2 | 6/2016 | Southcombe et al. |
| 9,362,826 B2 | 6/2016 | Giuliano |
| 9,374,001 B1 | 6/2016 | Subramaniam et al. |
| 9,413,257 B2 | 8/2016 | Wang et al. |
| 9,444,329 B2 | 9/2016 | Arno |
| 9,450,506 B2 | 9/2016 | Perreault et al. |
| 9,502,968 B2 | 11/2016 | Giuliano et al. |
| 9,553,550 B2 | 1/2017 | Puliafico et al. |
| 9,577,590 B2 | 2/2017 | Levesque et al. |
| 9,584,024 B2 | 2/2017 | Manthe et al. |
| 9,601,998 B2 | 3/2017 | Le et al. |
| 9,621,138 B1 | 4/2017 | Zhang et al. |
| 9,634,577 B2 | 4/2017 | Perreault |
| 9,712,051 B2 | 7/2017 | Giuliano |
| 9,722,492 B2 | 8/2017 | Levesque et al. |
| 9,742,266 B2 | 8/2017 | Giuliano et al. |
| 9,755,672 B2 | 9/2017 | Perreault et al. |
| 9,819,283 B2 | 11/2017 | Mahdavikhah et al. |
| 9,847,712 B2 | 12/2017 | Low et al. |
| 9,847,715 B2 | 12/2017 | Giuliano et al. |
| 9,882,471 B2 | 1/2018 | Giuliano |
| 9,899,919 B2 | 2/2018 | Crossley et al. |
| 9,900,204 B2 | 2/2018 | Levesque et al. |
| 10,236,766 B2 | 3/2019 | Meyvaert et al. |
| 10,243,457 B2 | 3/2019 | Puggelli et al. |
| 10,263,512 B2 | 4/2019 | Giuliano et al. |
| 10,274,987 B2 | 4/2019 | Puggelli et al. |

(56) References Cited

U.S. PATENT DOCUMENTS

| | | |
|---|---|---|
| 10,326,358 B2 | 6/2019 | Giuliano |
| 10,355,593 B1 | 7/2019 | Puggelli et al. |
| 10,374,512 B2 | 8/2019 | Szczeszynski et al. |
| 10,381,924 B2 | 8/2019 | Giuliano |
| 10,389,235 B2 | 8/2019 | Giuliano |
| 10,389,244 B2 | 8/2019 | Le et al. |
| 10,404,162 B2 | 9/2019 | Giuliano |
| 10,411,490 B2 | 9/2019 | Melgar et al. |
| 10,523,039 B2 | 12/2019 | Melgar et al. |
| 10,541,603 B2 | 1/2020 | Puggelli et al. |
| 10,601,311 B2 | 3/2020 | Meyvaert et al. |
| 10,644,590 B2 | 5/2020 | Giuliano et al. |
| 10,666,134 B2 | 5/2020 | Low et al. |
| 10,673,335 B2 | 6/2020 | Le et al. |
| 10,680,515 B2 | 6/2020 | Giuliano |
| 10,686,367 B1 * | 6/2020 | Low .................. H02M 1/36 |
| 10,686,380 B2 | 6/2020 | Giuliano |
| 10,715,035 B2 | 7/2020 | Li et al. |
| 10,720,832 B2 | 7/2020 | Meyvaert et al. |
| 10,770,976 B2 | 9/2020 | Giuliano et al. |
| 10,833,579 B1 | 11/2020 | Puggelli et al. |
| 10,958,166 B1 * | 3/2021 | Low .................. G05F 3/262 |
| 11,264,895 B2 | 3/2022 | Giuliano et al. |
| 11,342,844 B1 | 5/2022 | Meyvaert |
| 11,515,784 B2 | 11/2022 | Meyvaert |
| 11,811,304 B2 * | 11/2023 | Abesingha ............ H02M 3/158 |
| 2002/0008567 A1 | 1/2002 | Henry |
| 2002/0130704 A1 | 9/2002 | Myono et al. |
| 2002/0158660 A1 | 10/2002 | Jang et al. |
| 2003/0038669 A1 | 2/2003 | Zhang |
| 2003/0058665 A1 | 3/2003 | Kobayashi et al. |
| 2003/0151449 A1 | 8/2003 | Nakagawa et al. |
| 2003/0169096 A1 | 9/2003 | Hsu et al. |
| 2003/0169896 A1 | 9/2003 | Kirk, III et al. |
| 2003/0227280 A1 | 12/2003 | Vinciarelli |
| 2004/0041620 A1 | 3/2004 | D'Angelo et al. |
| 2004/0080964 A1 | 4/2004 | Buchmann |
| 2004/0095787 A1 | 5/2004 | Donaldson et al. |
| 2004/0170030 A1 | 9/2004 | Duerbaum et al. |
| 2004/0222775 A1 | 11/2004 | Muramatsu et al. |
| 2004/0246044 A1 | 12/2004 | Myono et al. |
| 2005/0007184 A1 | 1/2005 | Kamijo |
| 2005/0024125 A1 | 2/2005 | McNitt et al. |
| 2005/0068073 A1 | 3/2005 | Shi et al. |
| 2005/0088865 A1 | 4/2005 | Lopez et al. |
| 2005/0102798 A1 | 5/2005 | Kato |
| 2005/0136873 A1 | 6/2005 | Kim et al. |
| 2005/0169021 A1 | 8/2005 | Itoh |
| 2005/0207133 A1 | 9/2005 | Pavier et al. |
| 2005/0213267 A1 | 9/2005 | Azrai et al. |
| 2005/0254272 A1 | 11/2005 | Vinciarelli |
| 2005/0285767 A1 | 12/2005 | Wang et al. |
| 2005/0286278 A1 | 12/2005 | Perreault et al. |
| 2006/0139021 A1 | 6/2006 | Taurand |
| 2006/0186947 A1 | 8/2006 | Lin et al. |
| 2006/0213890 A1 | 9/2006 | Kooken et al. |
| 2006/0226130 A1 | 10/2006 | Kooken et al. |
| 2007/0018700 A1 | 1/2007 | Yen et al. |
| 2007/0035973 A1 | 2/2007 | Kitazaki et al. |
| 2007/0035977 A1 | 2/2007 | Odell |
| 2007/0051712 A1 | 3/2007 | Kooken et al. |
| 2007/0066224 A1 | 3/2007 | d'Hont et al. |
| 2007/0066250 A1 | 3/2007 | Takahashi et al. |
| 2007/0069818 A1 | 3/2007 | Bhatti et al. |
| 2007/0091655 A1 | 4/2007 | Oyama et al. |
| 2007/0123184 A1 | 5/2007 | Nesimoglu et al. |
| 2007/0146020 A1 | 6/2007 | Williams |
| 2007/0146052 A1 | 6/2007 | Byeon |
| 2007/0146090 A1 | 6/2007 | Carey et al. |
| 2007/0159257 A1 | 7/2007 | Lee et al. |
| 2007/0171680 A1 | 7/2007 | Perreault et al. |
| 2007/0182368 A1 | 8/2007 | Yang |
| 2007/0210774 A1 | 9/2007 | Kimura et al. |
| 2007/0230221 A1 | 10/2007 | Lim et al. |
| 2007/0247222 A1 | 10/2007 | Sorrells et al. |
| 2007/0247253 A1 | 10/2007 | Carey et al. |
| 2007/0281635 A1 | 12/2007 | McCallister et al. |
| 2007/0290747 A1 | 12/2007 | Traylor et al. |
| 2007/0291718 A1 | 12/2007 | Chan et al. |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee et al. |
| 2008/0008273 A1 | 1/2008 | Kim et al. |
| 2008/0009248 A1 | 1/2008 | Rozenblit et al. |
| 2008/0012637 A1 | 1/2008 | Aridas et al. |
| 2008/0013236 A1 | 1/2008 | Weng |
| 2008/0019459 A1 | 1/2008 | Chen et al. |
| 2008/0024198 A1 | 1/2008 | Bitonti et al. |
| 2008/0031023 A1 | 2/2008 | Kitagawa et al. |
| 2008/0051044 A1 | 2/2008 | Takehara |
| 2008/0055946 A1 | 3/2008 | Lesso et al. |
| 2008/0062724 A1 | 3/2008 | Feng et al. |
| 2008/0136500 A1 | 6/2008 | Frulio et al. |
| 2008/0136559 A1 | 6/2008 | Takahashi et al. |
| 2008/0136991 A1 | 6/2008 | Senda |
| 2008/0150619 A1 | 6/2008 | Lesso et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0158915 A1 | 7/2008 | Williams |
| 2008/0186081 A1 | 8/2008 | Yamahira et al. |
| 2008/0231233 A1 | 9/2008 | Thornton |
| 2008/0233913 A1 | 9/2008 | Sivasubramaniam |
| 2008/0239772 A1 | 10/2008 | Oraw et al. |
| 2008/0266917 A1 | 10/2008 | Lin et al. |
| 2008/0284398 A1 | 11/2008 | Qiu et al. |
| 2009/0004981 A1 | 1/2009 | Eliezer et al. |
| 2009/0033289 A1 | 2/2009 | Xing et al. |
| 2009/0033293 A1 | 2/2009 | Xing et al. |
| 2009/0039843 A1 | 2/2009 | Kudo |
| 2009/0059630 A1 | 3/2009 | Williams |
| 2009/0066407 A1 | 3/2009 | Bowman et al. |
| 2009/0072800 A1 | 3/2009 | Ramadass et al. |
| 2009/0102439 A1 | 4/2009 | Williams |
| 2009/0147554 A1 | 6/2009 | Adest et al. |
| 2009/0174383 A1 | 7/2009 | Tsui et al. |
| 2009/0176464 A1 | 7/2009 | Liang et al. |
| 2009/0196082 A1 | 8/2009 | Mazumder et al. |
| 2009/0206804 A1 | 8/2009 | Xu et al. |
| 2009/0225012 A1 | 9/2009 | Choi |
| 2009/0230934 A1 | 9/2009 | Hooijschuur et al. |
| 2009/0257211 A1 | 10/2009 | Kontani et al. |
| 2009/0273955 A1 | 11/2009 | Tseng et al. |
| 2009/0278520 A1 | 11/2009 | Perreault et al. |
| 2009/0302686 A1 | 12/2009 | Fishman |
| 2009/0303753 A1 | 12/2009 | Fu et al. |
| 2009/0309566 A1 | 12/2009 | Shiu |
| 2009/0311980 A1 | 12/2009 | Sjoland |
| 2009/0322304 A1 | 12/2009 | Oraw |
| 2009/0322414 A1 | 12/2009 | Oraw et al. |
| 2009/0323380 A1 | 12/2009 | Harrison |
| 2010/0013548 A1 | 1/2010 | Barrow |
| 2010/0027596 A1 | 2/2010 | Bellaouar et al. |
| 2010/0060326 A1 | 3/2010 | Palmer et al. |
| 2010/0073084 A1 | 3/2010 | Hur et al. |
| 2010/0085786 A1 | 4/2010 | Chiu et al. |
| 2010/0097104 A1 | 4/2010 | Yang et al. |
| 2010/0110741 A1 | 5/2010 | Lin et al. |
| 2010/0117612 A1 | 5/2010 | Klootwijk et al. |
| 2010/0117700 A1 | 5/2010 | Raghunathan et al. |
| 2010/0117719 A1 | 5/2010 | Matano |
| 2010/0118458 A1 | 5/2010 | Coffey |
| 2010/0120475 A1 | 5/2010 | Taniuchi et al. |
| 2010/0123447 A1 | 5/2010 | Vecera et al. |
| 2010/0140736 A1 | 6/2010 | Lin et al. |
| 2010/0142239 A1 | 6/2010 | Hopper |
| 2010/0156370 A1 | 6/2010 | Tseng et al. |
| 2010/0164579 A1 | 7/2010 | Acatrinei |
| 2010/0176869 A1 | 7/2010 | Horie et al. |
| 2010/0201441 A1 | 8/2010 | Gustavsson |
| 2010/0202161 A1 | 8/2010 | Sims et al. |
| 2010/0205614 A1 | 8/2010 | Harrington |

(56) References Cited

U.S. PATENT DOCUMENTS

| | | |
|---|---|---|
| 2010/0214746 A1 | 8/2010 | Lotfi et al. |
| 2010/0237833 A1 | 9/2010 | Abe |
| 2010/0244189 A1 | 9/2010 | Klootwijk et al. |
| 2010/0244585 A1 | 9/2010 | Tan et al. |
| 2010/0244935 A1 | 9/2010 | Kim et al. |
| 2010/0291888 A1 | 11/2010 | Hadjichristos et al. |
| 2010/0308751 A1 | 12/2010 | Nerone |
| 2010/0321041 A1 | 12/2010 | Feldtkeler |
| 2011/0001542 A1 | 1/2011 | Ranta et al. |
| 2011/0026275 A1 | 2/2011 | Huang et al. |
| 2011/0050325 A1 | 3/2011 | Schatzberger et al. |
| 2011/0051476 A1 | 3/2011 | Manor et al. |
| 2011/0062940 A1 | 3/2011 | Shvartsman |
| 2011/0089483 A1 | 4/2011 | Reynes et al. |
| 2011/0101884 A1 | 5/2011 | Kim et al. |
| 2011/0101938 A1 | 5/2011 | Ma et al. |
| 2011/0115550 A1 | 5/2011 | Pelley |
| 2011/0148385 A1 | 6/2011 | North et al. |
| 2011/0148518 A1 | 6/2011 | Lejon et al. |
| 2011/0156819 A1 | 6/2011 | Kim et al. |
| 2011/0163414 A1 | 7/2011 | Lin et al. |
| 2011/0175591 A1 | 7/2011 | Cuk |
| 2011/0176335 A1 | 7/2011 | Li et al. |
| 2011/0181115 A1 | 7/2011 | Vanov |
| 2011/0181128 A1 | 7/2011 | Perreault et al. |
| 2011/0204858 A1 | 8/2011 | Kudo |
| 2011/0236766 A1 | 9/2011 | Kolosnitsyn et al. |
| 2011/0241767 A1 | 10/2011 | Curatola et al. |
| 2011/0273151 A1 | 11/2011 | Lesso et al. |
| 2011/0304310 A1 | 12/2011 | Sotono |
| 2012/0014153 A1 | 1/2012 | Christoph et al. |
| 2012/0043818 A1 | 2/2012 | Stratakos et al. |
| 2012/0050137 A1 | 3/2012 | Hellenthal et al. |
| 2012/0064953 A1 | 3/2012 | Dagher et al. |
| 2012/0075891 A1 | 3/2012 | Zhang et al. |
| 2012/0105137 A1 | 5/2012 | Kok et al. |
| 2012/0119718 A1 | 5/2012 | Song |
| 2012/0126909 A1 | 5/2012 | McCune, Jr. |
| 2012/0139515 A1 | 6/2012 | Li |
| 2012/0146177 A1 | 6/2012 | Choi et al. |
| 2012/0146451 A1 | 6/2012 | Nitta |
| 2012/0153907 A1 | 6/2012 | Carobolante et al. |
| 2012/0153912 A1 | 6/2012 | Demski et al. |
| 2012/0154023 A1 | 6/2012 | Pan et al. |
| 2012/0158188 A1 | 6/2012 | Madala |
| 2012/0170334 A1 | 7/2012 | Menegoli et al. |
| 2012/0176195 A1 | 7/2012 | Dawson et al. |
| 2012/0200340 A1 | 8/2012 | Shook et al. |
| 2012/0212201 A1 | 8/2012 | Lee et al. |
| 2012/0223773 A1 | 9/2012 | Jones et al. |
| 2012/0243267 A1 | 9/2012 | Kassayan |
| 2012/0249096 A1 | 10/2012 | Enenkel |
| 2012/0249224 A1 | 10/2012 | Wei et al. |
| 2012/0250360 A1 | 10/2012 | Orr et al. |
| 2012/0252382 A1 | 10/2012 | Bashir et al. |
| 2012/0268030 A1 | 10/2012 | Riesebosch |
| 2012/0313602 A1 | 12/2012 | Perreault et al. |
| 2012/0326684 A1 | 12/2012 | Perreault et al. |
| 2013/0005286 A1 | 1/2013 | Chan et al. |
| 2013/0044519 A1 | 2/2013 | Teraura et al. |
| 2013/0049714 A1 | 2/2013 | Chiu |
| 2013/0049885 A1 | 2/2013 | Rozman et al. |
| 2013/0058049 A1 | 3/2013 | Roth et al. |
| 2013/0058141 A1 | 3/2013 | Oraw |
| 2013/0069614 A1 | 3/2013 | Tso et al. |
| 2013/0094157 A1 | 4/2013 | Giuliano |
| 2013/0106380 A1 | 5/2013 | Marsili et al. |
| 2013/0154491 A1 | 6/2013 | Hawley |
| 2013/0154600 A1 | 6/2013 | Giuliano |
| 2013/0163302 A1 | 6/2013 | Li et al. |
| 2013/0163392 A1 | 6/2013 | Braunberger |
| 2013/0181521 A1 | 7/2013 | Khlat |
| 2013/0187612 A1 | 7/2013 | Aiura |
| 2013/0201729 A1 | 8/2013 | Ahsanuzzaman et al. |
| 2013/0229841 A1 | 9/2013 | Giuliano |
| 2013/0234785 A1 | 9/2013 | Dai et al. |
| 2013/0241625 A1 | 9/2013 | Perreault et al. |
| 2013/0245487 A1 | 9/2013 | Aga |
| 2013/0279224 A1 | 10/2013 | Ofek |
| 2013/0287231 A1 | 10/2013 | Kropfitsch |
| 2013/0293310 A1 | 11/2013 | Levesque et al. |
| 2013/0313904 A1 | 11/2013 | Kayama |
| 2013/0322126 A1 | 12/2013 | Pan et al. |
| 2013/0343106 A1 | 12/2013 | Perreault et al. |
| 2013/0343107 A1 | 12/2013 | Perreault |
| 2014/0015731 A1 | 1/2014 | Khlat et al. |
| 2014/0022005 A1 | 1/2014 | Ramanan et al. |
| 2014/0070787 A1 | 3/2014 | Arno |
| 2014/0091773 A1 | 4/2014 | Burlingame et al. |
| 2014/0092643 A1 | 4/2014 | Luccato |
| 2014/0118065 A1 | 5/2014 | Briffa et al. |
| 2014/0118072 A1 | 5/2014 | Briffa et al. |
| 2014/0120854 A1 | 5/2014 | Briffa et al. |
| 2014/0167513 A1 | 6/2014 | Chang et al. |
| 2014/0167722 A1 | 6/2014 | Lee |
| 2014/0167853 A1 | 6/2014 | Haruna et al. |
| 2014/0177300 A1 | 6/2014 | Lagorce et al. |
| 2014/0184177 A1 | 7/2014 | Tournatory et al. |
| 2014/0266132 A1 | 9/2014 | Low et al. |
| 2014/0268945 A1 | 9/2014 | Low et al. |
| 2014/0313781 A1 | 10/2014 | Perreault et al. |
| 2014/0339918 A1 | 11/2014 | Perreault et al. |
| 2014/0355322 A1 | 12/2014 | Perreault et al. |
| 2015/0002195 A1 | 1/2015 | Englekirk |
| 2015/0023063 A1 | 1/2015 | Perreault et al. |
| 2015/0077175 A1 | 3/2015 | Giuliano et al. |
| 2015/0077176 A1 | 3/2015 | Szczeszynski et al. |
| 2015/0084701 A1 | 3/2015 | Perreault et al. |
| 2015/0255547 A1 | 9/2015 | Yuan et al. |
| 2015/0295497 A1 | 10/2015 | Perreault et al. |
| 2015/0318851 A1 | 11/2015 | Roberts et al. |
| 2016/0028302 A1 | 1/2016 | Low et al. |
| 2021/0305895 A1 | 9/2021 | Meyvaert |

FOREIGN PATENT DOCUMENTS

| | | |
|---|---|---|
| CN | 1057410 C | 10/2000 |
| CN | 1452306 A | 10/2003 |
| CN | 1483204 A | 3/2004 |
| CN | 1728518 A | 2/2006 |
| CN | 1761136 A | 4/2006 |
| CN | 1825485 A | 8/2006 |
| CN | 1988349 A | 6/2007 |
| CN | 101009433 A | 8/2007 |
| CN | 101034536 A | 9/2007 |
| CN | 101071981 A | 11/2007 |
| CN | 101079576 A | 11/2007 |
| CN | 101174789 A | 5/2008 |
| CN | 101286696 A | 10/2008 |
| CN | 101297465 A | 10/2008 |
| CN | 101399496 A | 4/2009 |
| CN | 101447753 A | 6/2009 |
| CN | 101563845 A | 10/2009 |
| CN | 101588135 A | 11/2009 |
| CN | 101611531 A | 12/2009 |
| CN | 101636702 A | 1/2010 |
| CN | 101647181 A | 2/2010 |
| CN | 101647182 A | 2/2010 |
| CN | 101662208 A | 3/2010 |
| CN | 101707437 A | 5/2010 |
| CN | 101765963 A | 6/2010 |
| CN | 101931204 A | 12/2010 |
| CN | 101976953 A | 2/2011 |
| CN | 101997406 A | 3/2011 |
| CN | 102055328 A | 5/2011 |
| CN | 102118130 A | 7/2011 |
| CN | 102171918 A | 8/2011 |
| CN | 102185484 A | 9/2011 |
| CN | 102210102 A | 10/2011 |
| CN | 102480291 A | 5/2012 |
| CN | 102769986 A | 11/2012 |
| CN | 102904436 A | 1/2013 |
| CN | 103178711 A | 6/2013 |
| CN | 103275753 A | 9/2013 |

(56) References Cited

FOREIGN PATENT DOCUMENTS

| | | |
|---|---|---|
| CN | 103636288 A | 3/2014 |
| CN | 103650313 A | 3/2014 |
| CN | 103650313 B | 3/2014 |
| CN | 103650314 A | 3/2014 |
| CN | 103975433 A | 8/2014 |
| CN | 104011985 | 8/2014 |
| CN | 104011985 A | 8/2014 |
| CN | 105229908 | 1/2016 |
| CN | 105229908 A | 1/2016 |
| CN | 108964442 A | 12/2018 |
| CN | 110277908 | 9/2019 |
| CN | 115580109 | 1/2023 |
| DE | 2705597 A1 | 8/1977 |
| DE | 3347106 A1 | 7/1985 |
| DE | 10358299 A1 | 7/2005 |
| DE | 112012005353 | 10/2014 |
| DE | 112013006828 T5 | 3/2016 |
| EP | 0513920 A2 | 11/1992 |
| EP | 0773622 A2 | 5/1997 |
| EP | 1199788 A1 | 4/2002 |
| EP | 1635444 B1 | 3/2006 |
| EP | 1750366 A2 | 2/2007 |
| EP | 2469694 A1 | 6/2012 |
| EP | 2705597 A2 | 3/2014 |
| EP | 2705597 B1 | 8/2018 |
| EP | 3425784 A1 | 1/2019 |
| FR | 2852748 A1 | 9/2004 |
| GB | 2232830 A | 12/1990 |
| GB | 2505371 A | 2/2014 |
| GB | 2512259 | 9/2014 |
| GB | 2526492 | 11/2015 |
| GB | 2526492 A | 11/2015 |
| GB | 2587732 | 4/2021 |
| GB | 2588878 | 5/2021 |
| GB | 2589040 | 5/2021 |
| JP | H05191970 A | 7/1993 |
| JP | H0787682 A | 3/1995 |
| JP | 09135567 A | 5/1997 |
| JP | 10327573 A | 12/1998 |
| JP | 10327575 A | 12/1998 |
| JP | H10327573 A | 12/1998 |
| JP | H10327575 A | 12/1998 |
| JP | 11235053 A | 8/1999 |
| JP | H11235053 A | 8/1999 |
| JP | 2000060110 A | 2/2000 |
| JP | 2000134095 A | 5/2000 |
| JP | 2002062858 A | 2/2002 |
| JP | 2002506609 A | 2/2002 |
| JP | 2002233139 A | 8/2002 |
| JP | 2002305248 A | 10/2002 |
| JP | 2003284324 A | 10/2003 |
| JP | 3475688 B2 | 12/2003 |
| JP | 2004187355 A | 7/2004 |
| JP | 2006025592 A | 1/2006 |
| JP | 2006050833 A | 2/2006 |
| JP | 2006067783 A | 3/2006 |
| JP | 2007215320 A | 8/2007 |
| JP | 2008118517 A | 5/2008 |
| JP | 2008220001 A | 9/2008 |
| JP | 2009022093 A | 1/2009 |
| JP | 2009513098 A | 3/2009 |
| JP | 2009165227 A | 7/2009 |
| JP | 2010045943 A | 2/2010 |
| JP | 20105219443 A | 6/2010 |
| JP | 2012157211 A | 8/2012 |
| JP | 2013034298 A | 2/2013 |
| JP | 2013065939 A | 4/2013 |
| JP | 5297116 B2 | 9/2013 |
| JP | 2014212654 A | 11/2014 |
| KR | 1019990002891 A | 1/1999 |
| KR | 20000052068 A | 8/2000 |
| KR | 1020100023304 A | 3/2010 |
| KR | 1020100138146 A | 12/2010 |
| KR | 1020110053681 A | 5/2011 |
| KR | 1020110061121 A | 6/2011 |
| KR | 1020120010636 A | 2/2012 |
| KR | 1020130066266 A | 6/2013 |
| KR | 1020140015528 A | 2/2014 |
| KR | 1020140033577 A | 3/2014 |
| KR | 1020140103351 | 8/2014 |
| KR | 1020150085072 A | 7/2015 |
| KR | 101556838 B1 | 10/2015 |
| KR | 1020150132530 | 11/2015 |
| KR | 1020200077607 | 6/2020 |
| KR | 20220098263 | 7/2022 |
| TW | 200701608 A | 1/2007 |
| WO | WO2004047303 A1 | 6/2004 |
| WO | WO2004047303 A8 | 6/2004 |
| WO | WO2006093600 A2 | 9/2006 |
| WO | WO2007136919 A2 | 11/2007 |
| WO | WO2009012900 A1 | 1/2009 |
| WO | WO2009112900 A1 | 9/2009 |
| WO | WO2010056912 A1 | 5/2010 |
| WO | WO2011089483 A1 | 7/2011 |
| WO | WO2012085598 A2 | 6/2012 |
| WO | WO2012151466 A2 | 11/2012 |
| WO | WO2012151466 A | 2/2013 |
| WO | WO2013059446 A1 | 4/2013 |
| WO | WO2013086445 A1 | 6/2013 |
| WO | WO2013096416 | 6/2013 |
| WO | WO2013096416 A1 | 6/2013 |
| WO | WO2014070998 A1 | 5/2014 |
| WO | WO2014143366 | 9/2014 |
| WO | WO2014143366 A1 | 9/2014 |

OTHER PUBLICATIONS

U.S. Appl. No. 61/380,522, Chris Levesque et al., filed Sep. 7, 2010.

U.S. Appl. No. 61/417,633, Chris Levesque et al., filed Nov. 29, 2010.

T. A. Meynard, H. Foch, "Multi-Level Conversion: High Voltage Choppers and Voltage-Source Inverters," IEEE Power Electronics Specialists Conference, pp. 397-403, 1992.

Markowski, "Performance Limits of Switched-Capacitor DC-DC Converters", IEEE PESC'95 Conference, 1995.

Linear Technology data sheet for part LTC3402, "2A, 3MHz Micropower Synchronous Boost Converter", 2000.

Ottman et al, "Optimized Piezoelectric Energy Harvesting Circuit using Step-Down Converter in Discontinuous Conduction Mode", IEEE Power Electronics Specialists Conference, pp. 1988-1994, 2002.

Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages, Doc 7043.

Pilawa-Podgurski et al. "Merged Two-Stage Power Converter Architecture with Soft Charging Switched-Capacitor Energy Transfer" 39th IEEE Power Electronics Specialists Conference, 2008, pp. 4008-4015.

Xiaoguo Liang et al., Evaluation of Narrow Vdc-Based Power Delivery Architecture in Mobile Computing System, IEEE Transactions on Industry Applications., Nov. 1, 2011, IEEE Service Center, Piscataway, NJ., US.

Xiaoguo Liang et al., "Evaluation of Narrow Vdc-Based Power Delivery Architecture in Mobile Computing System," IEEE Transactions on Industry Applications, vol. 47, No. 6: pp. 2539-2548 (Dec. 1, 2011).

Ma et al, "Design and Optimization of Dynamic Power System for Self-Powered Integrated Wireless Sensing Nodes" ACM ISLPED '05 conference (published at pp. 303-306 of the proceedings).

Texas Instruments data sheet for part TPS54310, "3-V to 6-V input, 3-A output synchronous-buck PWM switcher with integrated FETs", dated 2002-2005.

Wai-Shan Ng, et. al., "Switched Capacitor DC-DC Converter: Superior where the Buck Converter has Dominated", Electrical Engineering and Computer Sciences University of California at Berkeley, Technical Report No. UCB/EECS-2011-94, http://www.eecs.berkeley.edu/Pubs/TechRpts/2011/EECS-2011-94.html, Aug. 17, 2011, 141 pgs.

(56) References Cited

OTHER PUBLICATIONS

O. Abutbul et al. "Step-Up Switching-Mode Converter With High Voltage Gain Using a Switched-Capacitor Circuit" IEEE Transactions on Circuits and Systems I., vol. 50, pp. 1098-1102, Aug. 2003.
R. Pilawa-Podgurski and D. Perreault, "Merged Two-Stage Power Converter with Soft Charging Switched-Capacitor Stage in 180 nm CMOS," IEEE Journal of Solid-State Circuits, vol. 47, No. 7, pp. 1557-1567, Jul. 2012.
Sun—"High Power Density, High Efficiency System Two-Stage Power Architecture for Laptop Computers" Power Electronic Specialists Conference, pp. 1-7, Jun. 18, 2006, Doc 7596.
Umeno et al. "A New Approach to Low Ripple-Noise Switching Converters on the Basis of Switched-Capacitor Converters" IEEE International Symposium on Circuits and Systems, vol. 2, pp. 1077-1080, Jun. 1991.
Sun et al. "High Power Density, High Efficiency System Two-Stage Power Architecture for Laptop Computers", Power Electronics Specialists Conference, pp. 1-7, Jun. 2006.
Starzyk et al., "A DC-DC Charge Pump Design Based on Voltage Doublers," IEEE Transactions on Circuits and Systems—I. Fundamental Theory and Applications, vol. 48, No. 3, Mar. 2001, pp. 350-359.
Xu et al., "Voltage Divider and its Application in Two-stage Power Architecture," IEEE Twenty-First Annual IEEE Applied Power Electronics Conference and Exposition, pp. 499-504, Mar. 2006.
Luo—"Investigation of Switched-Capacitorized DC/DC Converters" 2009 IEEE 6th Intl. Power Electronics and Motion Control Conference, Wuhan, China, May 17-20, 2009, pp. 1270-1276, 7 pages, Doc 7050.
Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages, Doc 7049.
Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages, Doc 7042.
Wood et al, "Design, Fabrication and Initial Results of a 2g Autonomous Glider" IEEE Industrial Electronics Society, pp. 1870-1877, Nov. 2005.
Han et al. "A New Approach to Reducing Output Ripple in Switched-Capacitor-Based Step-Down DC-DC Converters" IEEE Transactions on Power Electronics, vol. 21, No. 6, pp. 1548-1555 Nov. 2006.
R. D. Middlebrook, "Transformerless DC-to-DC Converters with Large Conversion Ratios" IEEE Transactions on Power Electronics, vol. 3, No. 4, pp. 484-488, Oct. 1988.
Yeung, "Multiple Fractional Voltage Conversion Ratios for Switched Capacitor Resonant Converters", Jun. 1, 2001.
David Giuliano, "Miniaturized, low-voltage power converters with fast dynamic response" Thesis (Ph. D.)—Massachusetts Institute of Technology, Department of Electrical Engineering and Computer Science, Sep. 2013.
Wood—"Design, Fabrication and Initial Results of a 2g Autonomous Glider" IEEE Industrial Electronics Society, pp. 1870-1877, Nov. 2005, Doc 7598.
Middlebrook—"Transformerless DC-to-DC Converters with Large Conversion Ratios" IEEE Transactions on Power Electronics, vol. 3, No. 4, pp. 484-488, Oct. 1988, Doc 7592.
Han—"A New Approach to Reducing Outpur Ripple in Switched-Capacitor-Based Step-Down DC-DC Converters" IEEE Transactions on Power Electronics, vol. 21, No. 6, pp. 1548-1555, Nov. 2006, Doc 7589.
Abutbul—"Step-Up Switching-Mode Converter with High Voltage Gain Using a Switched-Capacitor Circuit" IEEE Transactions on Circuits and Systems I, vol. 50, pp. 1098-1102, Aug. 2003, Doc 7587.

Umeno—"A New Approach to Low Ripple-Noise Switching Converters on the Basis of Switched-Capacitor Converters" IEEE Intl. Symposium on Circuits and Systems, vol. 2, pp. 1077-1080, Jun. 1991, Doc 7597.
Pilawa-Podgurski—"Merged Two-Stage Power Converter Architecture with Soft Charging Switched-Capacitor Energy Transfer" 39th IEEE Power Electronics Specialists Conference, 2008, Doc 7594.
Pilawa-Podgurski—"Merged Two-Stage Power Converter with Soft Charging Switched-Capacitor Stage in 180 nm CMOS" IEEE Journal of Solid-State Circuits, vol. 47, No. 7, pp. 1557-1567, Jul. 2012, Doc 7595.
Lei—"Analysis of Switched-Capacitor DC-DC Converters in Soft-Charging Operation" 14th IEEE Workshop on Control and Modeling for Power Electronics, p. 1-7, Jun. 23, 2013, Doc 7590.
Axelrod—"Single-switch single stage switched-capacitor buck converter", Proc. of NORPIE 2004, 4th Nordic Workshop on Power and Industrial Electronics, Jun. 2004, Doc 7588.
Meynard—"Multi-Level Conversion: High Voltage Choppers and Voltage-Source Inverters" IEEE Power Electronics Specialists Conference pp. 397-403, 1992, Doc 7591.
Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages.
Makowski, "Performance Limits of Switched-Capacitor DC-DC Converters", IEEE PESC'95 Conference, 1995.
Lei et al. "Analysis of Switched-capacitor DC-DC Converters in Soft-charging Operation" 14thIEEE Workshop on Control and Modeling for Power Electronics, pp. 1-7, Jun. 23, 2013.
Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages.
Ng et al. "Switched Capacitor DC-DC Converter: Superior where the Buck Converter has Dominated" PhD Thesis, UC Berkeley, Aug. 17, 2011.
Axelrod et al. "Single-switch single-stage switched-capacitor buck converter", Proc. of NORPIE 2004, 4th Nordic Workshop on Power and Industrial Electronics, Jun. 2004.
Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages.
Axelrod et al. "Single-switch single-stage switched-capacitor buck converter", Proc. of NORPIE 2004, 4th Nordic Workshop on Power and Industrial Electronics, Jun. 2004, entire document, pp. 1-5 of pdf submission.
Pilawa-Podgurski et al. "Merged Two-Stage Power Converter Architecture with Soft Charging Switched-Capacitor Energy Transfer" 39th IEEE Power Electronics Specialists Conference, 2008.
Pal Andreassen et al., Digital Variable Frequency Control for Zero Voltage Switching and Interleaving of Synchronous Buck Converters, 12th International Power Electronics and Motion Control Conference, Aug. 1, 2006, IEEE, Pi Publication date: Aug. 1, 2006, Aug. 1, 2008.
Dong Cao, Fang Zheng Peng, Multiphase Multilevel Modular DC DC Converter for High-Current High-Gain TEG Application, vol. 47, Nr.:3,IEEE Transactions on Industry Applications., May 1, 2011, IEEE Service Center, Piscataway, NJ., US, Publication date:May 1, 2011.
Luo et al., "Investigation of switched-capacitorized DC/DC converters," 2009 IEEE 6th International Power Electronics and Motion Control Conference, Wuhan, China, May 17-20, 2009, pp. 1270-1276, doi: 10.1109/IPEMC.2009.5157581.
U.S. Appl. No. 16/919,033: Amended Application Data Sheet, filed Jul. 2, 2020, 7 pages.
Cheng, "New generation of switched capacitor converters," PESC 98 Record. 29th Annual IEEE Power Electronics Specialists Conference (Cat. No. 98CH36196), Fukuoka, Japan, May 22, 1998, pp. 1529-1535 vol. 2, doi: 10.1109/PESC.1998.703377.
Cervera et al. "A High Efficiency Resonant Switched Capacitor Converter with Continuous Conversion Ratio," Energy Conversion Congress and Exposition (ECCE), Sep. 2013, pp. 4969-4976.

(56) References Cited

OTHER PUBLICATIONS

Y. Lei, R. May and R. Pilawa-Podgurski, "Split-Phase Control: Achieving Complete Soft-Charging Operation of a Dickson Switched-Capacitor Converter," in IEEE Transactions on Power Electronics, vol. 31, No. 1, pp. 770-782, Jan. 2016, doi: 10.1109/TPEL.2015.2403715.

Alon Cervera et al. 'A high efficiency resonant switched capacitor converter with continuous conversion ratio' Energy Conversion Congress and Exposition, IEEE, 2013, pp. 4969-4976.

* cited by examiner

PROTECTION OF SWITCHED CAPACITOR POWER CONVERTER

CROSS-REFERENCE TO RELATED PATENT APPLICATIONS

This application is a continuation of U.S. application Ser. No. 17/163,323, filed Jan. 29, 2021, which is a divisional of U.S. application Ser. No. 16/850,991, filed Apr. 16, 2020, now U.S. Pat. No. 10,938,299, which is a continuation of U.S. application Ser. No. 15/719,929, filed Sep. 29, 2017, now U.S. Pat. No. 10,666,134, which is a continuation of U.S. application Ser. No. 14/776,939, filed Sep. 15, 2015, now U.S. Pat. No. 9,847,712, which is a National Stage Entry of International Application No. PCT/US2013/078243, filed Dec. 30, 2013, which is a continuation of U.S. application Ser. No. 13/838,681, filed Mar. 15, 2013, now U.S. Pat. No. 8,619,445. The content of these applications is hereby incorporated by reference in its entirety.

BACKGROUND

This invention relates to protection of switched capacitor power converters.

Various configurations of switched capacitor power conversion circuits provide voltage conversion (i.e., step up, step down, or bidirectional) between a high side voltage and a low side voltage through controlled transfers of charge between capacitors in the circuit. A Dickson charge pump is an example of such a conversion circuit. Control of the charge transfer between the capacitors generally makes use of circuit elements that act as "switches," for example, diodes or FET transistors.

Some configurations of switch elements and capacitors limit the typical maximum voltage across the switch elements in normal operation. Such limited voltages permit use of switch elements that do not necessarily have to accommodate the full high side voltage or the difference between the high side and the low side voltages, thereby permitting use "low voltage" elements. For example, in a conventional Dickson charge pump performing a conversion between 20 volts and 5 volts in 4 stages, switch elements typically experience a maximum of 10 volts in operation and therefore require a rating (e.g., breakdown voltage rating) of 10 volts.

Charge pumps step up or step down an input voltage by storing a fraction of the input voltage across each capacitor. As the magnitude of the voltage conversion increases, the number of capacitors required increases. Switches on both terminals of each capacitor are necessary to perform the charge transfer, as well as configure the charge pump to provide a desired voltage conversion ratio.

FIGS. 1A-1B show two charge pumps. The first in FIG. 1A is a 1:3 step-down configuration and the second in FIG. 1B is a 3:1 step-up configuration. The voltage labels on each node have two values, one for each stage of operation: voltage value during stage 1/voltage value during stage 2. Each switch needs to be turned on and off in a non-overlapping manner during stage 1 or stage 2. For either the step-up or step-down, the node labeled VX is the lowest charge pump voltage level: VX is typically the output of a step-down, and conversely the input of a step-up. VX also sets the unit voltage drop across each switch when the switch is off: the switches at the bottom of the capacitors each see a maximum voltage drop of VX, while the switches at the top of each capacitor see a maximum voltage drop of 2VX. This means that the transistors selected as switches at the top of the capacitors require a drain-to-source breakdown voltage ($BV_{DSS}$) above 2VX to avoid damage. In general the higher the $BV_{DSS}$ of a MOS transistor, the larger the transistor area and capacitances for a given on-resistance which increases die cost and switching power loss. Therefore, it is desirable to use a transistor whose $BV_{DSS}$ is close to the maximum voltage drop the transistor needs to support.

FIG. 2 shows an interleaved version of the step-down charge pump in FIG. 1A where the switches at the top of each capacitor now see a maximum voltage drop of only VX. It should be noted that the FIG. 2 interleaved topology may reduce the maximum voltage drop seen across each switch, as simply cascoding each of the top switches (or using two series-connected transistors per top switch), although other approaches may also achieves this purpose. For most CMOS processes, the efficiency and die area gains from using the same low $BV_{DSS}$ transistors are still advantageous enough to justify the higher transistor count and complexity. The complexity arises from having to control and operate these low-voltage transistors at various common-mode voltage multiples of VX. Referring to FIG. 2 as an example, the switch that connects the top-most capacitor to VIN at 6V can be a 3.3V transistor since the transistor sees 2V differentially across its drain-to-source terminals when not conducting, despite the absolute voltage levels at the transistor drain and source terminals (4V or 6V depending on the stage of operation; 4V being the common-mode voltage level for this switch) exceeding 3.3V. This is because $BV_{DSS}$ is a differential voltage constraint across the transistor drain-to-source terminal, rather than an absolute constraint at each of the transistor terminals. Although the drain and source terminals each have an absolute breakdown voltage to the silicon substrate, these absolute breakdown voltages are typically much higher than $BV_{DSS}$ and therefore allow the transistor to be operated at a common-mode voltage level above $BV_{DSS}$.

In addition to $BV_{DSS}$, another differential voltage constraint for a MOS transistor is the maximum gate-to-source voltage ($V_{GSmax}$) which is determined by the gate-oxide breakdown voltage. Modern CMOS processes with small geometries and low-voltage transistors require thinner gate oxides to maintain performance, which results in lower $V_{GSmax}$ ratings as well. This further complicates the design of a high voltage conversion ratio charge pump using low-voltage transistor switches, since care must be taken to avoid exceeding both gate-to-source and drain-to-source voltage constraints during switch operation.

Commonly available low-voltage transistor flavors such as the 1.8V, 3.3V and occasionally 5V transistors, usually specify a $V_{GSmax}$ rating equal to the maximum operating drain-to-source voltage rating, $V_{DSmax}$, where $V_{DSmax} < BV_{DSS}$. For applications where the minimum VX voltage in the operating range is sufficiently above the transistor threshold voltage, it becomes practical and convenient to use the same VX voltage level for the transistor gate drivers, instead of generating separate internal supply rails for this purpose. This is due to the fact that a VX-level voltage is already generated and supported between each non-switching node (e.g. VIN, VX, 4V node between the capacitors in FIG. 2) in the interleaved charge pump, inherent to the charge pump operation itself. Therefore, the gate driver for each transistor can be levelshifted to the common-mode voltage level of that transistor, use the same low-voltage transistors, and drive the transistor gate-to-source voltage between 0V and VX, as shown in FIG. 3. The nth section of an interleaved charge pump showing a pair of switches at the top of a capacitor, where n is an integer. An equivalent transistor-level representation is shown on the right with the gate drivers used to turn the transistors on and off. The transistors and the gate driver circuitry see a maximum of a VX voltage across them. The high-side switch shown is a PMOS transistor, but can also be an NMOS if its gate driver was bootstrapped between the capacitor node shown and an adjacent capacitor node that switches between $V_{n+1}$ and $V_{n+2}$ Charge-pumps step-down or step up an input voltage by storing a portion or multiples of the input voltage across capacitors. As the magnitude of the transformation increases, the number of capacitors used increases. Each capacitor helps create a unique intermediate voltage during part of the operating cycle. The switches used to re-arrange the capacitors into different configurations need to be powered by some energy source.

In FIGS. 4A-B, a series-parallel and a Dickson charge pump in a 1:5 (step-down) configuration (or 5:1—step-up— if the power flow is reversed) are shown. The voltage labels on each node have two values: the first is the voltage value during stage 1 of operation; the second is the voltage value during stage 2 of operation.

In a Dickson charge-pump, each stage sees only a small fraction of the total voltage at the high voltage side of the charge-pump. This allows for using lower voltage rated devices and improves efficiency. However, if the high-voltage side should suddenly step up rapidly, it is possible for the low-voltage switches to experience temporary over-voltage stress that can result in damage.

In general, it is important to protect the switch elements from being exposed to voltages in excess of their breakdown voltages to prevent damage to the conversion circuit or faulty operation of the circuit.

SUMMARY

In one aspect, in general, transient or fault conditions for a switched capacitor power converter are detected by measuring one or more of internal voltages and/or currents associated with switching elements (e.g., transistors) or phase nodes, or voltages or currents at terminals of the converter, and based on these measurements detect that a condition has occurred when the measurements deviate from a predetermined range. Upon detection of the condition fault control circuitry alters operation of the converter, for example, by using a high voltage switch to electrically disconnect at least some of the switching elements from one or more terminals of the converter, or by altering timing characteristics of the phase signals.

In another aspect, in general, in the event that a capacitor is accidentally shorted to the next stage, across itself, or to ground (such as its bottom plate to ground), an over-voltage and under-voltage protection can be implemented. Each capacitor in the charge-pump is monitored to see if it is within an acceptable range given the charge-pump ratio. For example, if the output of the charge-pump should be 2V, than the capacitor closest to the output should also be approximately 2V. In adiabatic charging, the capacitor voltage can vary quite a bit during each cycle, so there needs to be sufficient margin in the over and under voltage protection to account for normal voltage variation.

In another aspect, in general, a switched capacitor power converter has a first terminal for coupling to a first external circuit at substantially a high voltage, and a second terminal for coupling to a second external circuit at substantially a low voltage lower than the high voltage. In operation of the power converter, charge passes on a charge transfer path between the first terminal and the second terminal. The converter includes a plurality of semiconductor switch elements. These switch elements include a first set of switch elements on the charge transfer path between the first terminal and the second terminal, wherein no switch element in the first set of switch elements is connected in series with either the first terminal or the second terminal to carry substantially all the current passing through said terminal, and wherein each switch element in the first set of switch elements is configured to form a controllable charge transfer path between a corresponding subset of a plurality of capacitors. The switch elements also include a second set of switch elements configured to form electrical connection of at least some of the capacitors to alternating reference voltages. The plurality of switch elements is configured to form said interconnections in successive states in operation. The converter further includes measurement circuitry configured to measure a voltage and/or a current characteristic of one or more switch elements of the first set of switch elements or the second set of switch elements, and fault control circuitry coupled to the measurement circuitry configured to alter operation of the power converter upon detection of a condition determined when the measured characteristics of the switch elements deviate from a predetermined range of said characteristics.

Aspects can include one or more of the following features.

The plurality of switch elements further includes a third set of switch elements on the charge transfer path between the first terminal and the second terminal connected in series with either the first terminal or the second terminal.

The second set of switch elements include switch elements that form electrical connection of at least some of the capacitors to the low voltage terminal during some states of operation (e.g., at "phase nodes" of the converter).

The stages of operation comprise a repeated sequence of clocked stages.

The converter further comprises the plurality of capacitors, with each capacitor having a terminal coupled to a terminal of at least one switch element of the plurality of switch elements. In some examples, the capacitors and switch elements are integrated in a monolithic device.

The converter comprises a Dickson charge pump.

The voltage and/or current characteristics of the one or more switch elements belong to a group consisting of:
  a voltage across terminals of a switch element of the first set of switch elements;
  a current through a switch element of the first set of switch elements;
  a voltage at a junction between a switch element of the first set of switch elements and a capacitor of the plurality of capacitors;
  a voltage across terminals of a capacitor of the plurality of capacitors coupled to the switch element;
  a voltage at a junction between a switch element of the second set of switch elements and a capacitor of the plurality of capacitors; and
  a current through a switch element of the first set of switch elements.

The voltage and/or current characteristic of the switch element comprises a voltage across terminals of the switch element.

The voltage and/or current characteristic of the switch element comprises a current through the switch element.

The voltage and/or current characteristic of the switch element comprises a voltage at a terminal of the switch element.

The voltage and/or current characteristic of the switch element comprises a voltage across terminals of a capacitor of the plurality of capacitors coupled to the switch element.

The switch elements of the second set of switch elements form a phase generator, and wherein the voltage and/or current characteristic of the switch element comprises a voltage and/or current supplied by the phase generator.

Each of the semiconductor switch elements comprises a FET transistor for coupling at least two of the capacitors.

At least some of the semiconductor switch elements comprise a network of multiple FET transistors.

At least some of the switch elements of the first set of switch elements or the second set of switch elements have a maximum voltage rating less than the high voltage.

At least some of the switch elements of the first set of switch elements or the second set of switch elements have a maximum voltage rating less than the difference between the high voltage and the low voltage.

At least some of the switch elements of the first set of switch elements or the second set of switch elements have a maximum voltage rating no greater than a fraction $1/N$, $N>1$, of the difference between the high voltage and the low voltage.

The fault control circuitry comprises one or more switches each having maximum voltage rating greater than the voltage rating of at least some of the plurality of switches, the one or more switches being configured to electrically disconnecting or limit current flow through at least some switch elements of the plurality of switch elements. In some examples, the one or more switches comprise a switch coupled directly to the first terminal. In some examples, the one or more switches comprise a switch coupled between two switch elements of the plurality of switch elements.

The fault control circuitry is configured to modify the characteristics of the phases upon detection of the condition. In some examples, the characteristics of the phases belong to a group consisting of:
 a duty cycle of clocked phases;
 a clocking frequency of the phases; and
 a skipping of one or more clock cycles of clocked phases.

DESCRIPTION

1 Overview

Figure 1A:
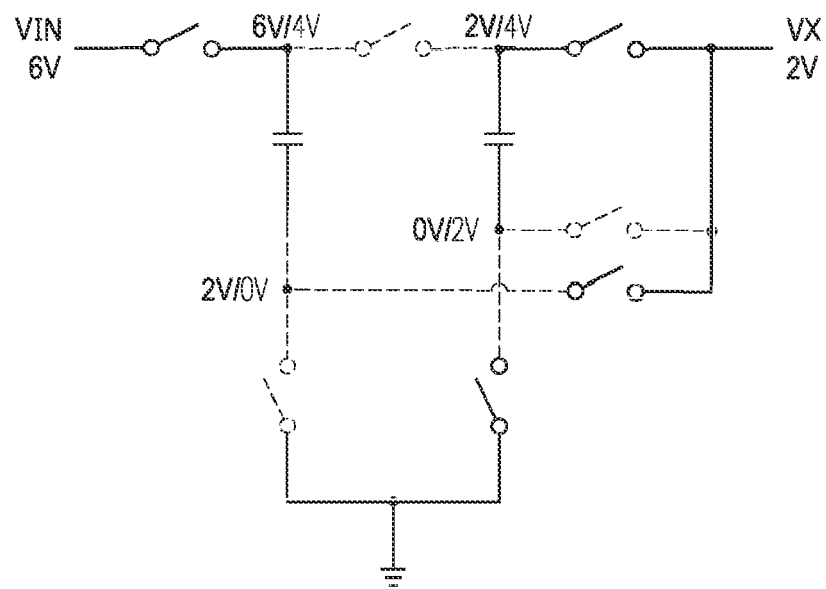
FIGS. 1A and 1B are schematics of a 1:3 voltage conversion ratio (step-down) charge pump a 3:1 voltage conversion ratio (step-up) charge pump, respectively.

A number of related approaches are described below for detection of faults (or potential faults or potential failures, exceeding device ratings, etc.) of switched capacitor power converters and/or circuitry coupled to such converters (e.g., load circuitry), and in some cases approaches for controlling operation of converters after detection of such faults, for example, to avoid failure within and external to the charge pump. These faults or failures may occur in operation, or in a shut-down (i.e., not actively operating as a power converter) but powered state. Note that the approaches described below may be used independently, and in general, may be used together in various combinations. Furthermore, it should be understood that although approaches described below may be illustrated in the context of a particular type of converter (e.g., a series/parallel or a Dickson), at least some of the approaches are applicable to a much wider range of converters.

A number of the approaches described below differ according to what is measured, and according to how the fault or failure is mitigated. Measurements can include one or more of
 voltage across the source and drain of a switching transistor
 current through a switching transistor;
 voltage at a terminal of a capacitor of the converter (e.g., at the terminal of a device to which an external capacitor is attached, at a terminal of a switching transistor is attached, etc.)
 voltage and/or current at the high voltage or low voltage terminal of the converter
 voltage and/or current at the output of a phase node, or at a terminal of a capacitor attached to a phase node Approaches to mitigating the fault or failure can include one or more of:
 Suspending operation of the converter (e.g., suspending the clocked operation);
 Modifying the clocking of the converter without suspending operation, for example, by increasing or slowing the clocking rate, changing the duty cycle, etc. to permit voltage equilibration within the converter, inhibiting all switching;
 Restarting the converter (e.g., executing a startup operation sequence);
 Controlling a high-voltage switch (transistor) at the high-voltage terminal of the converter, for example, to limit current flow through the converter (e.g., by opening the switch to stop current flow, or putting the switch in a constant current mode);
 Decoupling the electrical path(s) through the converter with one or more switches (e.g., high-voltage switches), which may be on internal paths in the converter;
 Generating a logic fault indicator that causes a pin transition or external interrupt signal so that the user is notified and can take corrective action (e.g. reducing the external load, suspending converter operation)

Changing the logic state of one or more bits in an internal register, according to the type of fault(s) detected, to assist the user in debugging the faults when the contents of this internal register are read back In the discussion below, FET transistors are used as examples of semiconductor switch elements. Other types of devices (e.g., other types of transistors), and networks of multiple devices (e.g., series and/or parallel connections of transistors) can be used to form such switches.

Note that in some implementations, the converter may include a number of parallel converters operating out of phase with one another (e.g, two parallel converters 180 degrees out of phase, three converters 120 degrees out of phase with overlapping phases, etc.), and the detection and mitigation approaches may be performed independently for each phase, or can be coordinated. For example, during a recovery/restart of one of the parallel converters, the other converters may be reconfigured to operate in a manner to provide uninterrupted power conversion (e.g., by suitably adjusting their relative phase, over clocking rate, etc.).

2 Over/Under Voltage Sensing at Terminals

As introduced above, one approach generally uses sensed voltages at the terminals of the converter to detect over- or under-voltage conditions. In a number of embodiments, the charge pump is configured to prevent charge pump operation under atypical or fault conditions that would a) exceed the $V_{GSmax}$ and $V_{DSmax}$ rating of the switching transistors, their gate drivers and associated control circuitry b) operate the transistors in a weak state where functional or parametric misbehavior can occur c) cause a subsystem connected in series with VX to operate outside of the normal range If event (a) occurs, the damage to the charge pump can be immediate or long-term whereby the part may continue to operate but at a reduced robustness and performance level. Events (b) and (c) can cause abnormal operating behavior, which can also degrade part robustness and performance. Such events can occur since VX is likely to be a package pin, thereby exposed and vulnerable to physical contact by the user. Furthermore, the assembly process itself may cause shorts or opens to occur on a package pin or external component, or create shorts between adjacent pins or components. For instance, a user probing various nodes on the package or board while operating a step-down charge pump may inadvertently short VX to ground or to a supply rail. Or the user may unintentionally apply a larger than specified load current on VX, causing the VX voltage to drop below the normal operating range. When the capacitors are external to the charge pump die and package, an assembly process defect may leave out a capacitor or leave open one of the capacitor connections to the charge pump. If the charge pump was operated with a missing or open capacitor, the VX voltage would also drop.

In applications where the charge pump is operated in series with another subsystem such as an LDO or another switching converter (inductor- or capacitor-based), VX can either be the input that powers this subsystem or the subsystem output that powers the charge pump. In both cases, an under-voltage or over-voltage event at VX may be undesirable for the performance and robustness of the subsystem as well.

2.1 VX Under-Voltage and Over-Voltage Sensing and Lockout

In some embodiments the VX voltage is sensed during operation or in the shutdown-but-powered state, and an internal indicator is generated by circuitry in or associated with the charge pump to disable operation or prevent charge pump operation upon enable (lockout), whenever the VX voltage moves outside a predefined voltage window. When VX drops below the lower limit of the window, VX is under-voltage while VX is over-voltage when VX rises above the upper limit of the window. VX under-voltage (UVLO) and over-voltage (OVLO) sensing and lockout implements a first-order protection of the low-voltage transistors used in a high voltage conversion ratio charge pump, by preventing charge pump operation if the transistor absolute maximum voltage ratings are exceeded or if the transistor cannot switch reliably due to insufficient gate drive.

The OVLO threshold, or the upper limit of the VX-sensing window, should be set above the maximum operating VX level required by the application but below the $V_{DSmax}$ rating of the transistors, to give margin for tolerances in the OVLO circuit and VX voltage transients. The UVLO threshold, or the lower limit of the VX-sensing window, is set, for example, below the minimum operating VX level including the largest VX ripple amplitude that would occur across the application space, but above the level where basic transistor functionality would fail or degrade to a point that would adversely affect the performance of the charge pump and/or the subsystem connected in series with VX. Examples of the latter constraint are the voltage at which the gate driver output fails to transition according to the gate driver input, or where the gate driver's propagation delay increases to an extent that would cause misbehavior elsewhere in the charge pump. Depending on the application space, there is usually more flexibility in setting the UVLO threshold versus the OVLO threshold, since the latter is constrained mainly by the voltage rating of the charge pump transistors. Instead of a fixed voltage level, the UVLO threshold can be variable as a function of the VX voltage level and the VX ripple amplitude, if such information was available to the charge pump through sensed inputs or internally programmed settings. For instance, the charge pump switching frequency and capacitor values could be internally programmed settings and these settings directly govern the VX ripple amplitude.

Figure 5:
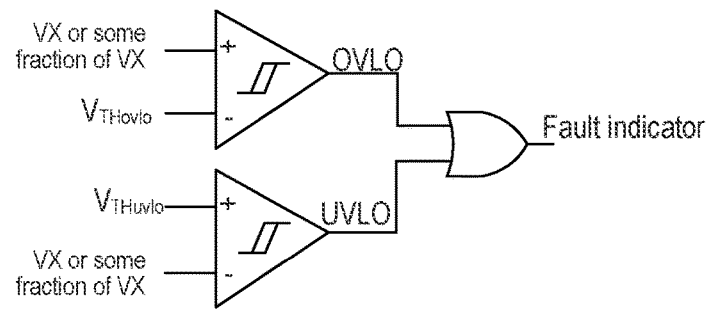
FIG. 5 is a schematics of fault indicator circuit.

FIG. 5 shows a circuit example that implement UVLO and OVLO sensing at the VX node. The example uses two comparators whose outputs are combined by an OR gate to generate a logical fault indicator. The inputs to the comparators are VX or some fraction of VX generated using an internal voltage divider, and the thresholds $V_{THuvlo}$ and $V_{THovlo}$, which are scaled from the UVLO and OVLO threshold by the same fraction as the VX-based input to the comparator. For all practical purposes, $V_{THovlo} > V_{THuvlo}$. When the VX voltage lies in between the UVLO and OVLO thresholds, the outputs of the comparators are both low and therefore the fault indicator is also a logic low. Otherwise the fault indicator will be a logic high and this logic state can be used to disable charge pump operation or enable.

Note that while most of the charge pump illustrations above are for a step-down configuration, this approach can also be applied in similar fashion to step-up configurations, since the one is a reverse-direction power flow version of the other.

3 Detection of Internal Voltage Deviations

Another approach detects deviations of voltage on capacitors in the converter outside their expected operating ranges.

3.1 Detection Scheme 1

Figure 6:
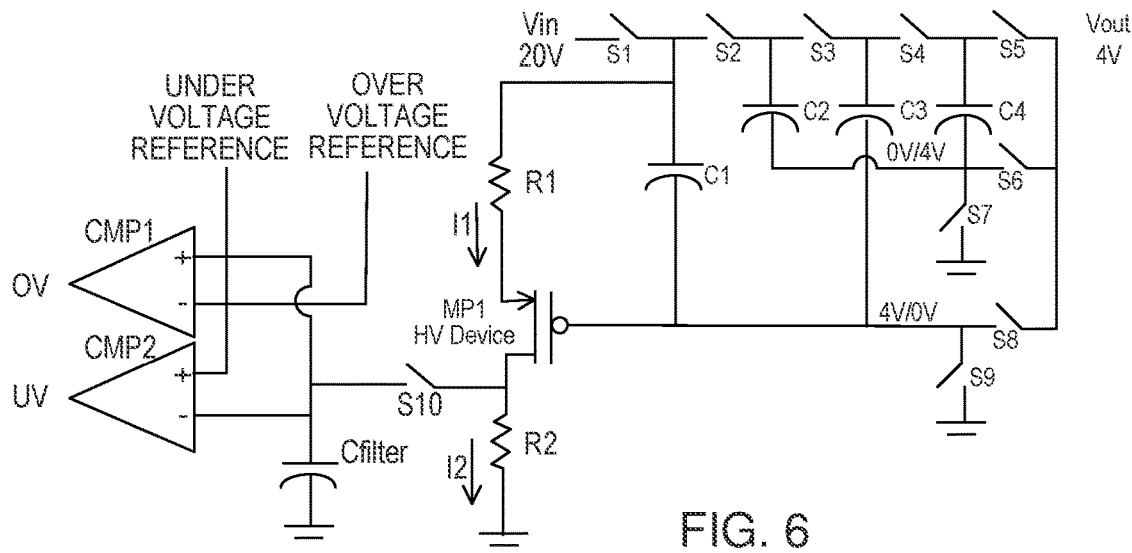
FIG. 6 is a schematic of charge pump with a fault detection circuit.

FIG. 6 shows the basic technique applied to the detection of a fault condition on capacitor C1. A similar circuit is needed to monitor the voltages on C2, C3 and C4. This example shows a 5:1 step-down Dickson charge pump, but can be similarly applied, as other examples, to a step-up configuration, to all possible charge pump ratios and to the Series-Parallel charge pump topology.

The charge pump operates in a substantially conventional manner, with the addition of PMOS device MP1 (which has to be selected to operate at the higher voltage across C1), together with resistors R1 and R2 as well as switch S10 and comparators CMP1 and CMP2.

Current I1 is roughly proportional to the voltage across C1 (the error is the source-gate voltage of MP1). Current I2 is very nearly identical to I1. By proper selection of R2 the voltage across this resistor is, roughly, an analog of the voltage across C1 and can be scaled as desired. Switch S10, along with capacitor Cfilter, is used to allow detection of the voltage on R2 only when switch S8 is on (switch S9 forces the R2 voltage to be 0). CMP1 and CMP2, along with the Under Voltage and Over Voltage reference voltages form what is called a window comparator. Either the OV or UV outputs being asserted indicates a fault condition which then triggers one or several of the protection mechanisms implemented.

3.2 Detection Scheme 2

Figure 7:
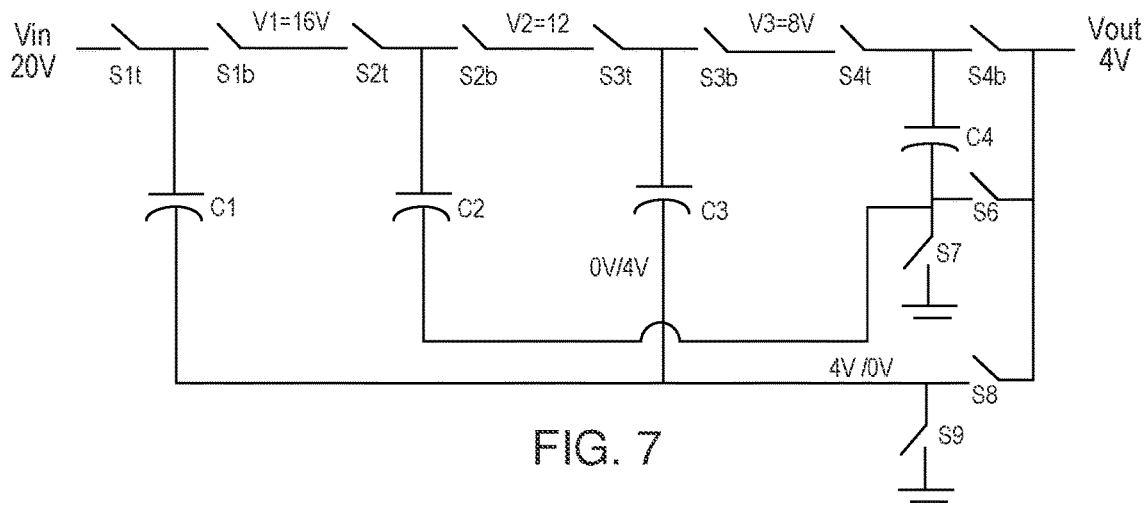
FIG. 7 is a schematic of charge pump with cascoded switches.

FIG. 7 shows a possibly more practical embodiment of the 5:1 Dickson charge pump. The additional switches are required because, with reference to the figure FIG. 6—switches S2, S3 and S4 are exposed, when in the off state, to twice the voltage across switches S1 and S5 in the off state.

Figure 8:
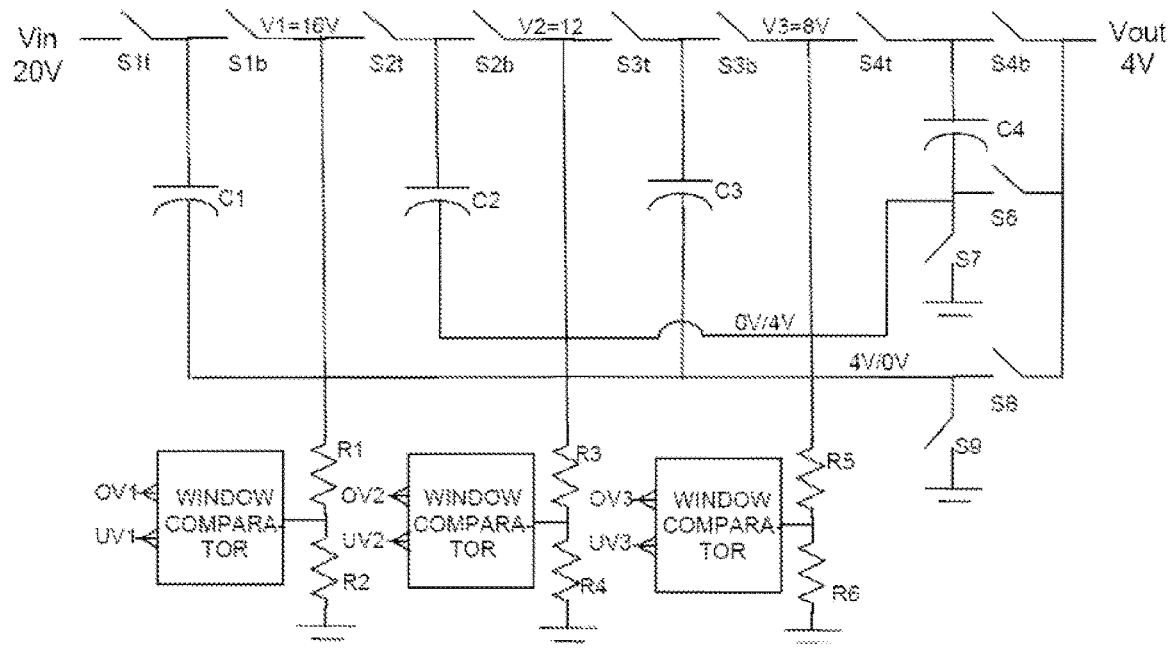
FIG. 8 is a schematic of charge pump with cascoded switches and detection circuitry.

For a given charge pump ratio and a fixed VIN, annotated voltages V1, V2 and V3 do not change appreciably. FIG. 8 shows a detection scheme that relies on detecting a large change in voltage across the charge pump caps by means of a window comparator for each capacitor (previously described above). The input to this window comparator is an attenuated version of the charge pump capacitor voltages themselves. Resistor ratios R1/R2, R3/R4 and R5/R6 are chosen so as to appropriately scale those capacitor voltages.

Comparator output signals OV_and UV_can be used to trigger any or all of the protection mechanisms being implemented.

4 High-Side Transient Protection

Figure 9:
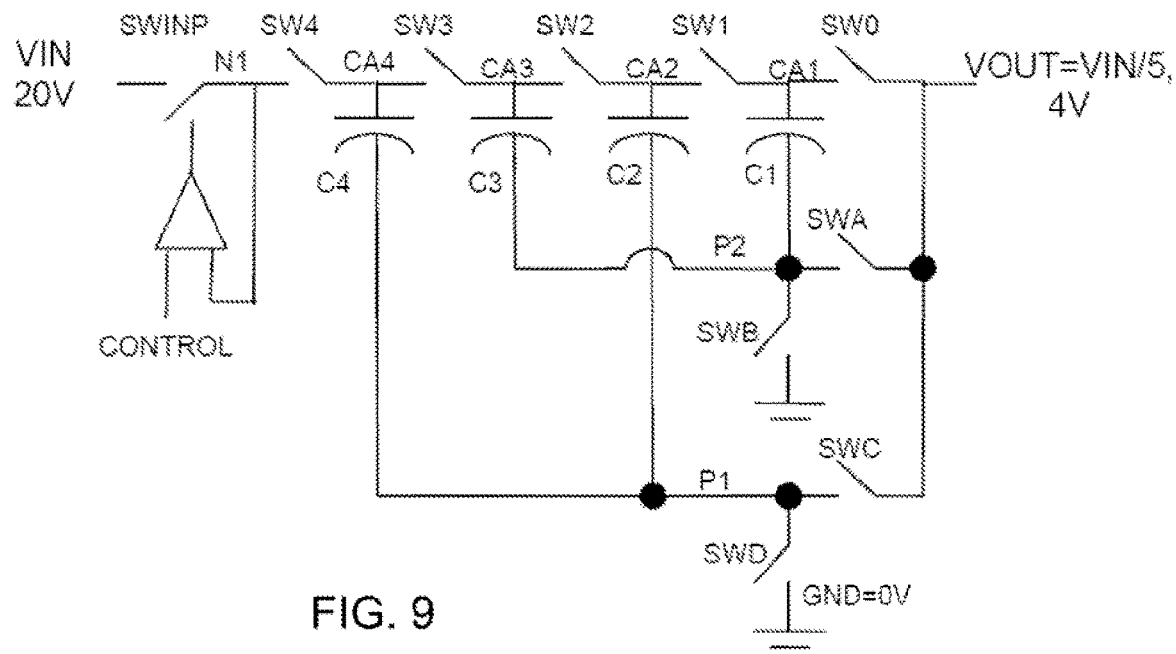
FIG. 9 is a schematic of a charge pump with input control.

Referring to FIG. 9, another way of protecting from a transient fault is to use a high-voltage disconnect (SWINP) switch that performs as a voltage or current limiting device during a transient event. The method implemented in the circuit of FIG. 9 controls the SWINP switch with one or a combination of several modes of operation.

One possible mode is as a Low Drop Out (LDO) regulator.

A second mode is a Current Limited (CL) switch.

A third mode is a Transient Voltage Suppressor (TVS).

In LDO mode the voltage at N1 has a maximum value. The CONTROL does not allow voltage on N1 to exceed the maximum voltage that the charge-pump can sustain. In the condition where VIN is less than the maximum voltage the switch SWINP would be in a low impedance state. For example the maximum allowed voltage on N1 is 22 volts. In normal operation the voltage on VIN is 20 volts. The voltage on N1 is almost 20 volts. The VIN supply rises to 22 volts. The voltage on N1 remains at 20 volts.

In CL mode there is a maximum current that SWINP will allow to pass through from VIN to N1. In the condition where N1 is at or below the maximum voltage set by the LDO, the output current of SWINP is limited. For example in normal operation VIN=16 volts and voltage on N1 is almost 16 volts. The current through SWINP is <1 ampere. A situation arises where the current through SWINP would need to supply 3 amperes to maintain node N1 at 16 volts. This 3 amperes is above the safe operating range on the switches. The CONTROL would limit the SWINP current to 2 amperes and the voltage on N1 would decrease. Note that this mode is also useful to indirectly mitigate the effect of transient voltages on the terminals.

In TVS mode the voltage on N1 is not allowed to change by more than a predefined rate. The voltage on N1 is below the maximum allowed by the LDO, the current is below the maximum allowed by CL. The TVS will allow the charge-pump to redistribute the voltage from N1 appropriately on the capacitors C_. For example in normal operation VIN=16 volts. The current through SWINP is <1 ampere. A situation arises where the voltage on VIN rises to 18 volts in $10^{-6}$ seconds (1 μs). The maximum voltage slew rate on N1 is designed to be 0.100 volts per μs. The voltage on N1 will rise to 18 volts, but the CONTROL would make it take 20 us to reach this new voltage level on N1.

4.1 High-Side Protection

In a conventional Dickson Charge-pump (see, e.g., FIG. 4B), each stage sees only a small fraction of the total voltage at the high voltage side (VIN) of the charge-pump. In steady state operation the voltage across any of SW_does not exceed VOUT. This allows for using lower voltage rated switches and improves efficiency.

Prior to power being applied to the circuit all nodes are at zero volts (GND) potential. When a voltage VIN is first applied to the circuit, the voltage across the capacitors C1, C2, C3, C4 is still zero volts. This requires the switch SW4 to be designed to support the full voltage of VIN.

The switches SW_are all regularly toggled between a low impedance state and a high impedance state in a predefined sequence. Each switch SW_has a gate capacitance. The charging and discharging of the gate capacitance is a power loss. When a switch is toggled there is a finite power loss. This power loss reduces the efficiency of the charge-pump. The power loss is dependent on the switch design.

A higher voltage rated switch will typically have much larger gate capacitance. The toggling power loss of a high voltage designed switch is significantly larger than the power loss from a low voltage designed switch of the same low impedance value.

Figure 10:
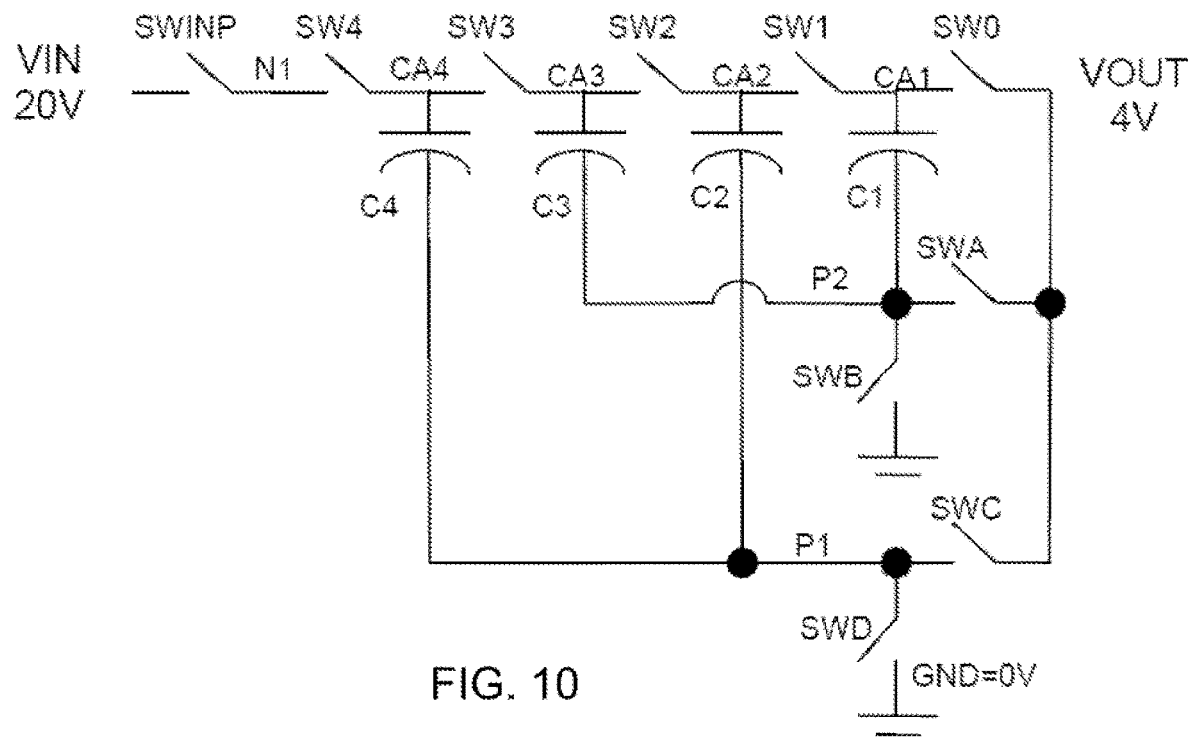
FIG. 10 is a schematic of a charge pump with input disconnect.

It is advantageous to use an additional disconnect switch (SWINP) on the high-voltage side that is designed for high voltages, as shown in FIG. 10. Since this switch doesn't toggle periodically when the charge-pump is operating, its large gate capacitance doesn't affect performance.

During powerup the switch SWINP is able to manage the voltages applied to the remaining switches. The voltage on N1 is managed such that the capacitors C_can approach steady state voltages without over stressing the switches SW_. This allows the remaining switches to all remain low voltage designed switches.

There are several possible faults for a charge-pump power converter. Faults include both internal and external devices. Faults can occur prior to power being applied or during powered operation. A capacitor can become an electrical open or any two nodes can be electrically shorted. Common faults include assembly errors with too much or insufficient solder at the printed circuit board connections. When a fault does occur, this SWINP switch can then current limit or disconnect the high-voltage side from the charge-pump and help protect it from damaging current levels.

5 Phase Node Monitoring

A number of further approaches make use of monitoring current at the phase nodes of the converter.

Embodiments of such n approaches are described below and provide an efficient way to detect the numerous types of fault events that may affect both the charge pump and its capacitors. The detected fault events include phase node shorted to a fixed rail (ground or phase-pump supply); positive terminal of a capacitor shorted to a fixed rail (ground or input voltage VIN) or charge pump output voltage VOUT; positive terminal of a first capacitor shorted to the positive terminal of a second capacitor (the first capacitor being closest to input voltage VIN); missing capacitor or open capacitor terminal; and charge pump output shorted to ground or output over-current.

These fault events are most likely to occur when the charge pump uses external or non-integrated capacitors, since these components and their connections are exposed and vulnerable to physical contact by the user. Furthermore, the assembly process itself may cause shorts or opens to occur on a pin or component, or create shorts between adjacent pins or components. The fault events can either occur during start-up or normal operation.

Embodiments described below rely at least in part on the recognition that an extensive fault coverage for charge pumps in an efficient way (in terms of die area, quiescent current) can be achieved by sensing the current in the charge pump phase nodes. By sensing the current flow through each switch while the switch conducts, a fault event can be detected based on the switch current magnitude and polarity.

It is also possible to detect some of the aforementioned fault events by sensing the current through the input voltage VIN or through the switches at the positive terminal of each capacitor. However, the input voltage VIN and the positive terminals of each capacitor can operate at a high voltage depending on the charge pump configuration, thereby requiring the current-sense circuit to be designed using high-voltage devices or be powered between high-voltage rails.

Designing for high-voltage operation typically requires more die area and more quiescent current, compared to an equivalent circuit that is powered from the lowest charge pump voltage level, as would be used in the approach described here. Furthermore, this method can result in significantly higher die area and quiescent current savings when the phase nodes common to an operating state are shared since there would only be two phase nodes per charge pump, compared to current sensing at the switches of each capacitor's positive terminal where no node or pin sharing is possible. However, such sharing is not essential (e.g., with a separate phase node for each capacitor) to obtain the benefit of the approach.

Figure 11A:
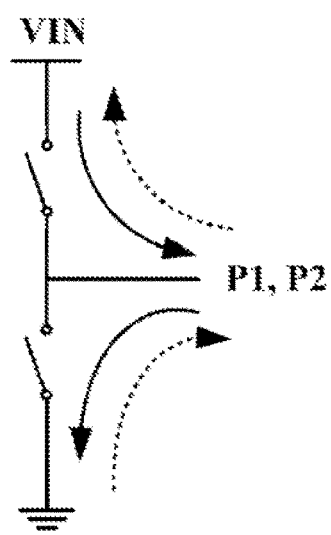
FIGS. 11A-B are schematics of high-side and low-side switches for a step-down and a step-up, respectively.
Figure 11B:
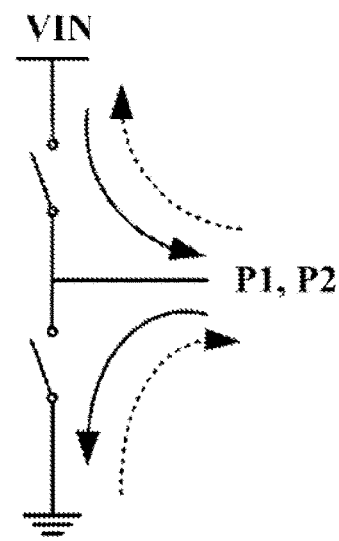

FIG. 11A defines the current flow polarity through the high-side and low-side switches for a step-down charge pump. Similarly, FIG. 11B defines the current flow polarity through the high-side and low-side switches for a step-up charge pump. The current flow polarity during normal operation is illustrated by the solid arrows, while the reverse current flow polarity that may occur upon a fault event is illustrated by the dashed arrows.

For some fault events, the conducting high-side or low-side switch sees only an atypical increase in the current magnitude compared to the magnitude in the absence of a fault. In other events, the conducting high-side or low-side switch sees both a reversal in the polarity of current flow and an increase in current magnitude. Since the state of every switch (conducting or not) in the charge pump is always known and well-controlled, it is not difficult to compare the switch current magnitude and/or polarity to a predefined level that signals a valid fault event. This predefined level can be fixed for all operating conditions of the charge pump, user-programmable or track specific signals like output load current, if such information were available to the charge pump. Upon the detection of the fault event, part damage or a "smoke-and-fire" occurrence can be prevented by immediately turning off all phase node switches and letting the phase nodes go high-impedance. Note that for protection against some types of faults, the switches controlling the phase nodes have to have a high voltage rating.

TABLE 1 summarizes the current flow polarity through the high-side and low-side switches of a step-down charge pump for the following fault events: A phase node shorted to ground, a phase node shorted to phase-pump supply, a positive terminal of a capacitor shorted to ground, a positive terminal of a capacitor shorted to the input voltage VIN, a positive terminal of a capacitor shorted to the output voltage VOUT, a positive terminal of a first capacitor shorted to a positive terminal of a second capacitor, and charge pump output shorted to ground or output over-current. For a step-up charge pump, the high-side and low-side switch current flow polarity would be the inverse of the step-down, except for the fault events denoted with an asterix.

TABLE 1

| Fault Event | High-side Switch Current Flow Polarity | Low-side Switch Current Flow Polarity |
|---|---|---|
| (a) A phase node shorted to ground | Reverse | N/A |
| (b) A phase node shorted to phase-pump supply | N/A | Reverse |
| (c) A positive terminal of a capacitor shorted to ground | Reverse | Normal |
| (d) A positive terminal of a capacitor shorted to the input voltage VIN* | Normal | Reverse |
| (e) A positive terminal of a capacitor shorted to the output voltage VOUT* | Reverse | Normal |
| (f) A positive terminal of the first capacitor shorted to the positive terminal of the second capacitor* | Normal | Reverse |
| (g) Missing capacitor or open capacitor terminal | Normal | Normal |
| (h) Charge pump output shorted to ground or output over-current | Normal | Normal |

With the exception of an output over-current, the faults listed in TABLE 1 are much less likely to occur when the capacitors are integrated on the same die as the charge pump, connected to the charge pump die using a through-silicon via process, or consist of discrete components co-packaged on top of the charge pump die within a single module. However, having fault detection can still be useful as a diagnostic tool or for preventing smoke-and-fire events when process defects (e.g. metal shorts or opens between adjacent on-chip capacitors) or co-packaging errors occur.

Figure 12A:
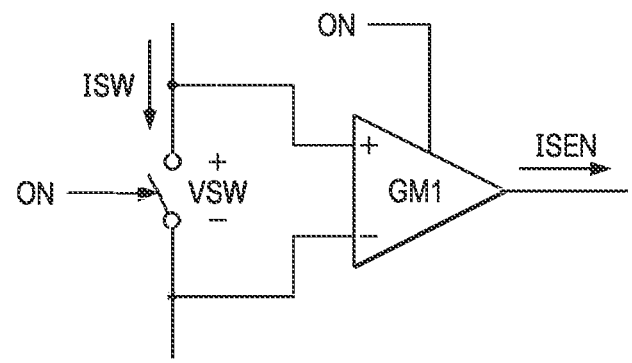
FIGS. 12A-B are schematics of current sensing circuits.
Figure 12B:
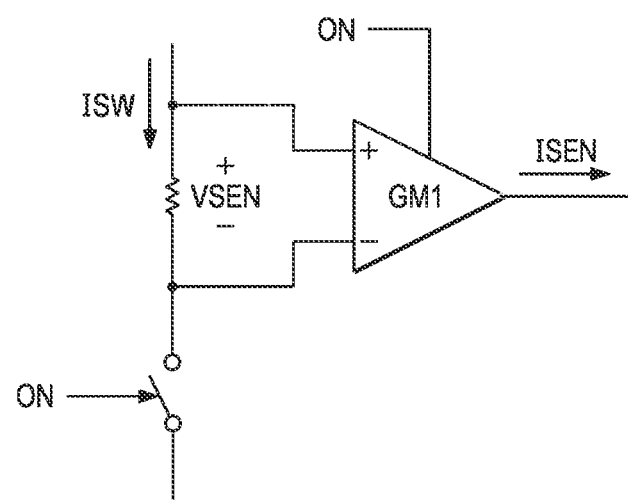

FIGS. 12A-B illustrate two circuits that can be used to perform switch current sensing. Both circuits utilize a transconductance amplifier GM1 to convert a voltage drop across either a switch or a sense resistor in series with the switch into a sense current ISEN, whose magnitude is proportional to the switch current ISW. The polarity of sense current ISEN in and out of the amplifier GM1 follows the polarity of the switch current ISW. The sense current ISEN can then be directly compared with a current whose magnitude and polarity are consistent with the fault event to be detected, to generate a logic-level output fault indicator.

For example, if the transconductance of amplifier GM1 in FIG. 12A is designed to be directly proportional to the switch conductance, then the sense current ISEN can be a direct multiple of the switch current ISW and no other variable to a first order. Alternatively in FIG. 12B, the sense resistor in series with the switch can consist of the metal interconnect between the switch and the package pins, which can be on the same order of magnitude as the switch on-resistance.

Figure 13:
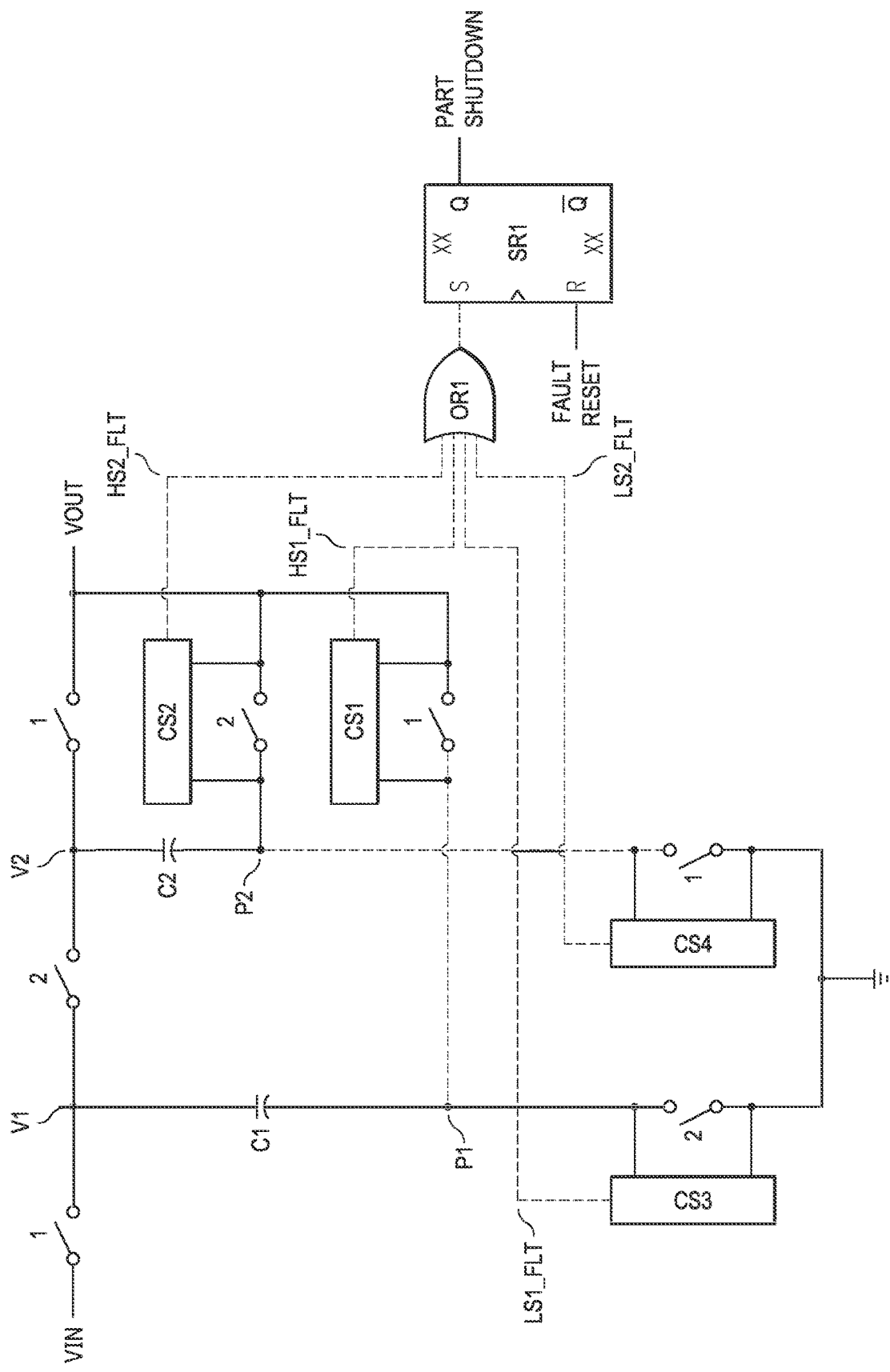
FIG. 13 is a schematic of a fault detector with a charge pump as shown in FIG. 1A.

FIG. 13 shows how an example of the fault detector can be coupled with the charge pump in FIG. 1A. Across each of the four switches at the phase nodes P1 and P2 is a current sensing and comparator circuit: CS1 senses the high-side switch current at phase node P1, CS2 senses the high-side switch current at phase node P2, CS3 senses the low-side switch current at phase node P1, and CS4 senses the low-side switch current at phase node P2. Each of the four current sensing and comparator circuits has a logic output that is a logic-low when no fault is detected, and a logic-high when a fault is detected based on the switch current magnitude and polarity changes. If any one or more of the four current sensing and comparator circuits CS1 to CS4 has a logic-high output in the middle of charge pump operation, a logic gate OR1 will output a logic-high signal that sets a set-reset latch SR1, thereby generating a latched logic signal that can be used to close all switches, shut down the charge pump immediately and generate a bus interrupt or toggle an output fault indicator pin. The charge pump then remains in shutdown until a fault reset signal is received by the set-reset latch SR1, at which point charge pump operation can resume. The fault reset signal can come from a supply undervoltage-lockout or a toggle on the charge pump enable input.

Figure 14:
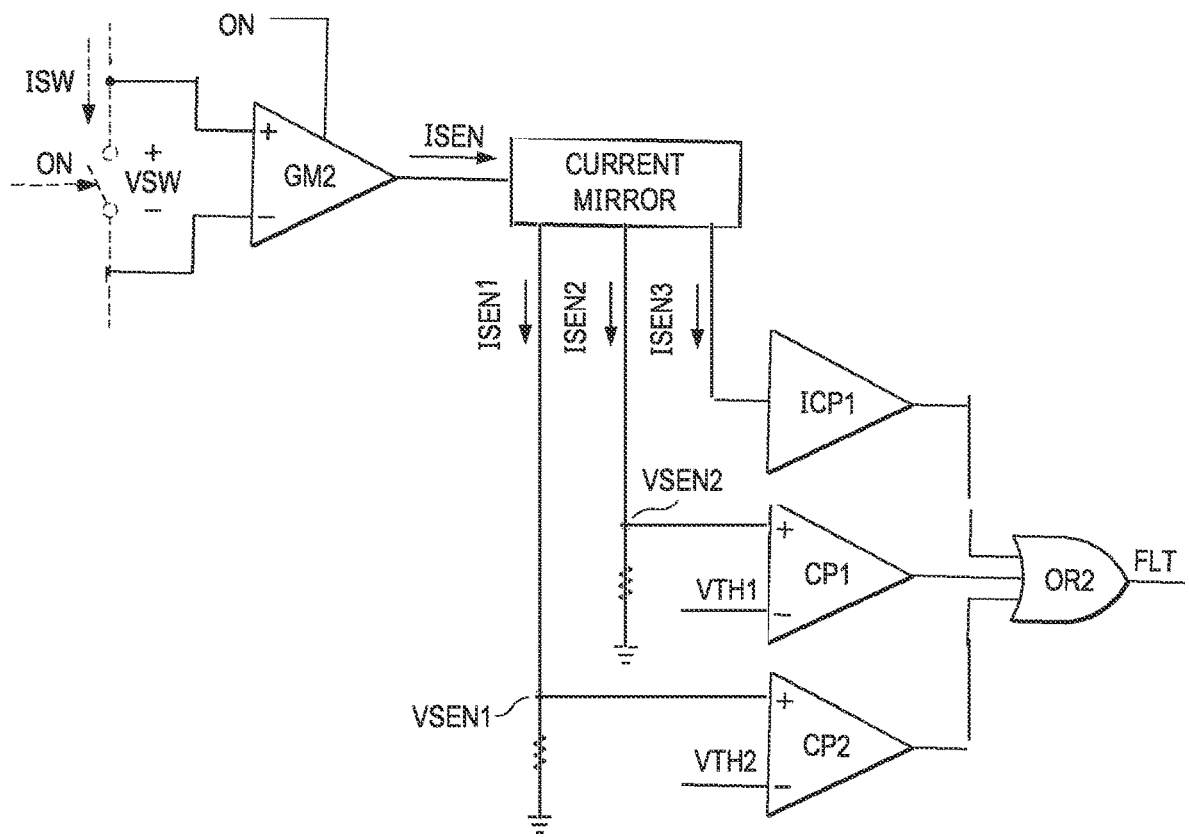
FIGS. 14-15 are schematics to current sensing and comparator circuits suitable for use in the circuit of FIG. 13.
Figure 15:
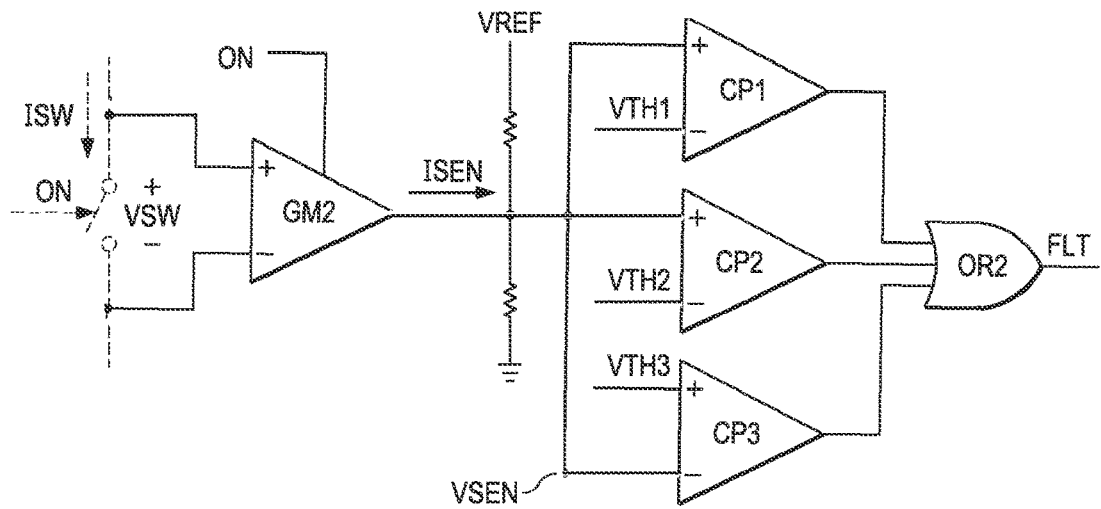

FIGS. 14 and 15 illustrate two circuits that implement the current sensing and comparator circuit in FIG. 13, where the same implementation can apply to all four current sensing and comparator circuits CS1 to CS4. The current sensing portion of FIGS. 14-15 can be implemented using either the circuit in FIG. 12A or FIG. 12B, though only the circuit in FIG. 12A is shown. In FIG. 14, the sense current ISEN whose magnitude and polarity follows the switch current is mirrored into three separate currents ISEN1 to ISEN3 using a current mirror or a current amplifier, each equaling the sense current ISEN or its multiple. The currents ISEN1 and ISEN2 can be individually converted into voltages VSEN1 and VSEN2 using resistors, which are then compared against threshold voltages VTH1 and VTH2 using voltage comparators CP1 and CP2 respectively. The current ISEN3 is fed into a single-ended current comparator ICP1 (such as a Traff current comparator) used to determine current polarity: when the switch current polarity is normal, the sense current ISEN flows out of the transconductance amplifier GM2 and the mirrored current ISEN3 flows into the single-ended current comparator ICP1 input terminal, causing the output voltage of ICP1 to be a logic-low; conversely when the switch current polarity reverses upon a fault event, the sense current ISEN also reverses polarity and the mirrored current ISEN3 flows out of the single-ended current comparator ICP1 input terminal, causing the output voltage of ICP1 to be a logic-high. The voltage comparators CP1 and CP2 are used to determine whether the magnitude of the normal polarity switch current exceeds a level consistent with a fault event. Different fault events can be associated with different switch current magnitudes, and can be detected and differentiated by using more than one comparator input voltage threshold (VTH1≠VTH2). The outputs of voltage comparators CP1, CP2 and ICP1 are combined in a logical OR operation by the logic gate OR2 to generate a logical fault indicator that is logic-high whenever any one or more of the comparator outputs are logic-high. It should be noted that the comparators CP1 and CP2 do not have to be voltage comparators, but can also be differential current comparators, in which case the resistors are no longer needed and the voltage thresholds VTH1 and VTH2 should be replaced with current threshold levels consistent with each fault event to be detected.

Figure 4A:
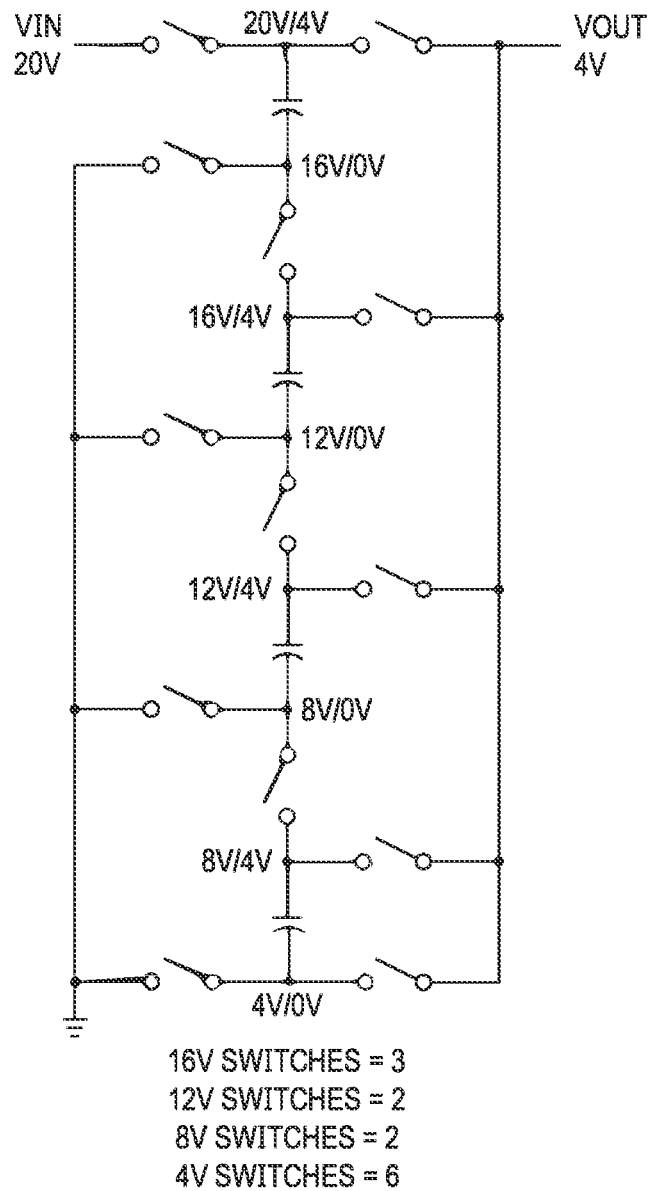
FIGS. 4A-B are schematics of a series-parallel and a Dickson charge pump, respectively.
Figure 4B:
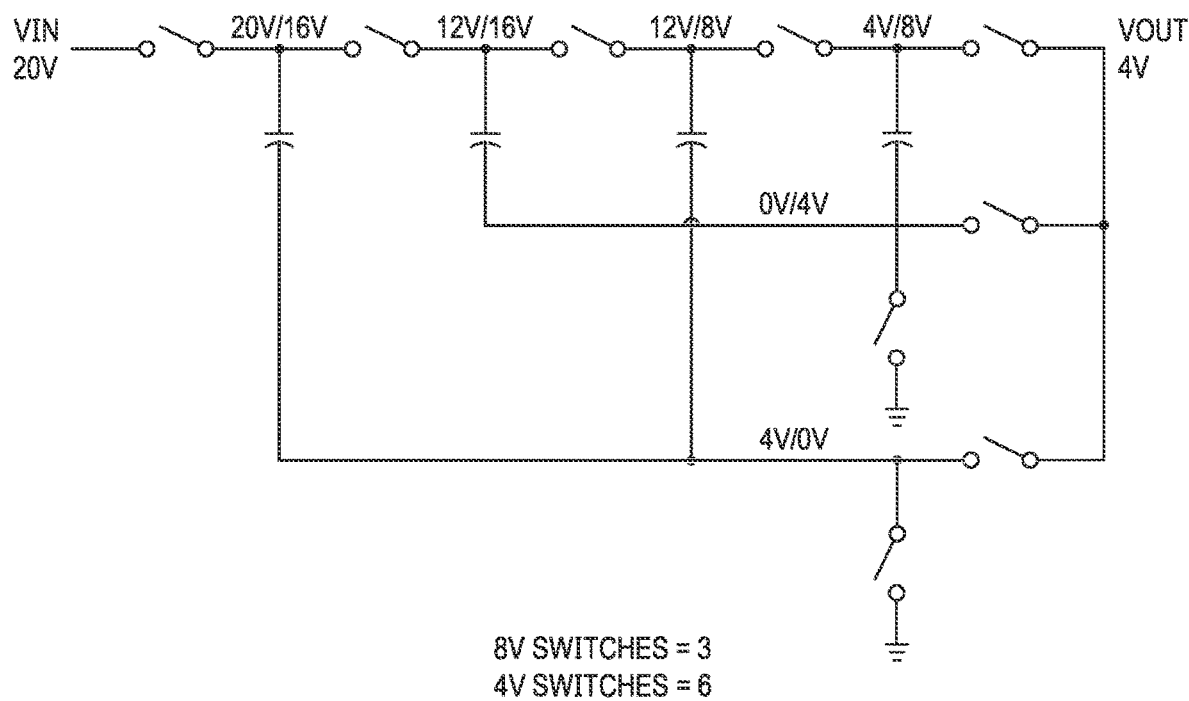

FIG. 15 shows an alternate implementation of the current sensing and comparator circuit in FIG. 4A, where instead of using a single-ended current comparator like ICP1 in FIG. 4B to sense a reversal in switch current polarity, a voltage comparator CP3 similar to voltage comparators CP1 and CP2 is used. The sense current ISEN is fed into a resistor divider network powered off a reference voltage, VREF, while a common voltage tap off the resistor divider network, VSEN, is compared by three voltage comparators CP1 to CP3. The magnitude of the voltage tap VSEN is a function of both the magnitude and polarity of the sense current ISEN: when the switch current polarity is normal, the sense current ISEN flows out of the transconductance amplifier GM2 and into the resistor divider network at the voltage tap point VSEN, thereby increasing the magnitude of VSEN above the level defined as VDIV that would ordinarily be determined by the value of the resistor divider ratio and the reference voltage, VREF. Therefore, the threshold voltages VTH1 and VTH2, which correspond to fault events where the switch current magnitude is atypically elevated, should be set above VDIV. Upon a fault event where the switch current polarity reverses, the sense current ISEN flows into the transconductance amplifier GM2 output, pulling the voltage tap VSEN below VDIV. Consequently, the threshold voltage VTH3 should be set below VDIV. Like FIG. 4B, the outputs of voltage comparators CP1 to CP3 are combined in a logical OR operation by the logic gate OR2 to generate a logical fault indicator that is logic-high whenever any one or more of the comparator outputs are logic-high.

A missing capacitor or open capacitor terminal fault event typically does not result in immediate charge pump damage or a smoke-and-fire event. Nevertheless, it is desirable to detect this fault occurrence and take preventive measures such as shutting down the charge pump, otherwise the charge pump will continue to operate for several cycles before eventually exceeding specified tolerances.

Figure 1B:
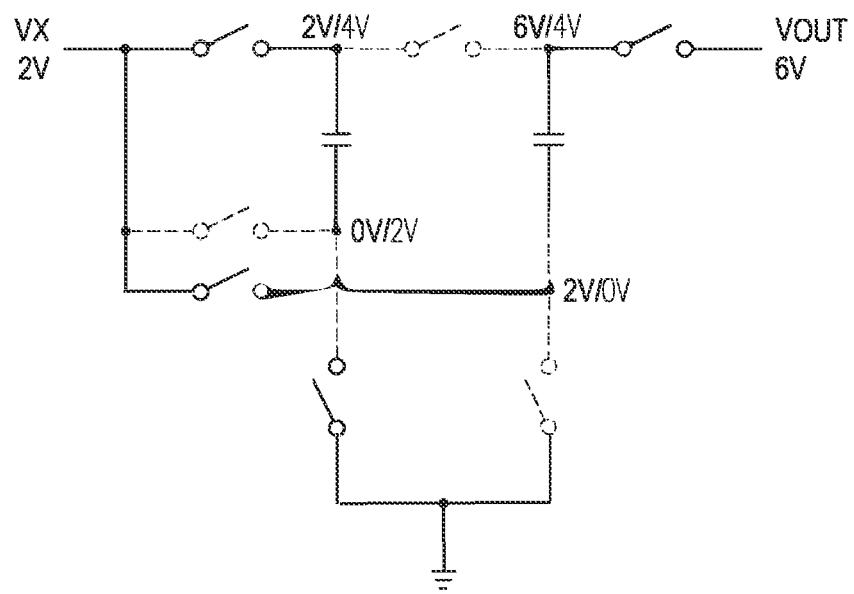
Figure 2:
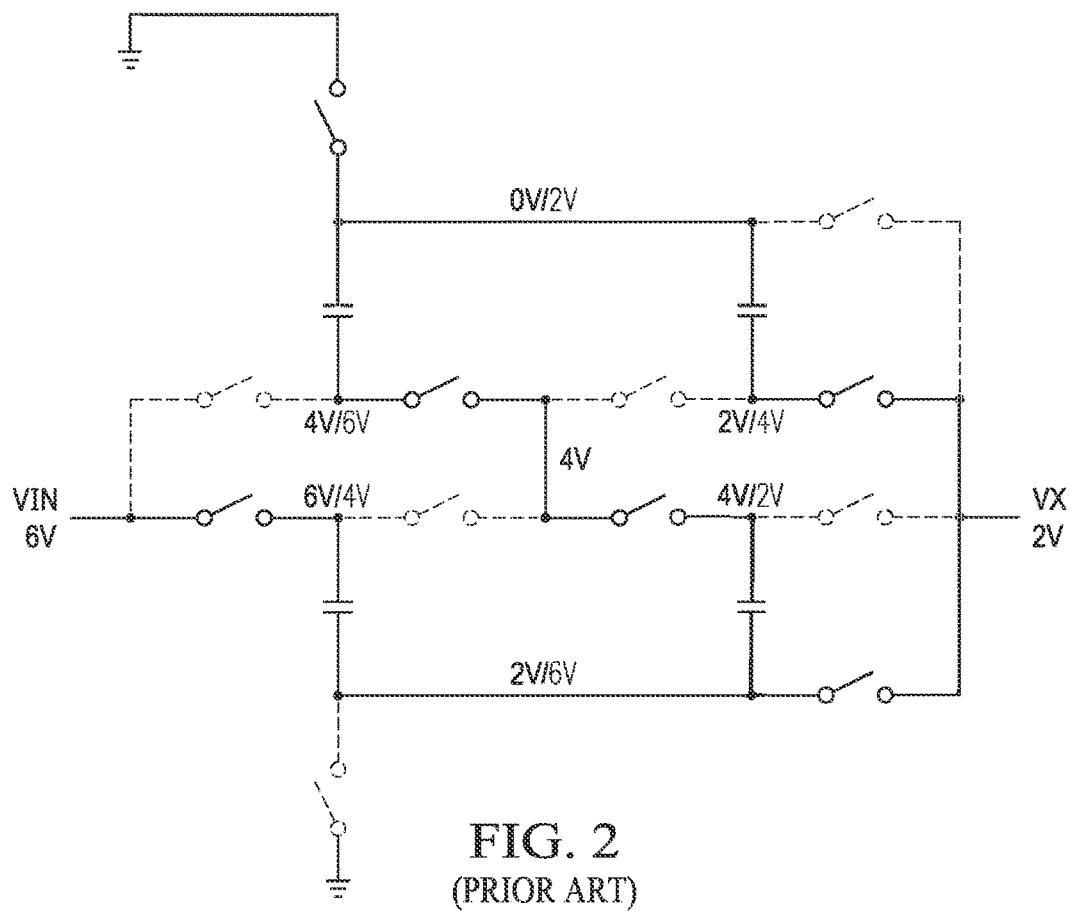
FIG. 2 is a schematic of an interleaved version of the step-down charge pump in FIG. 1A.
Figure 3:
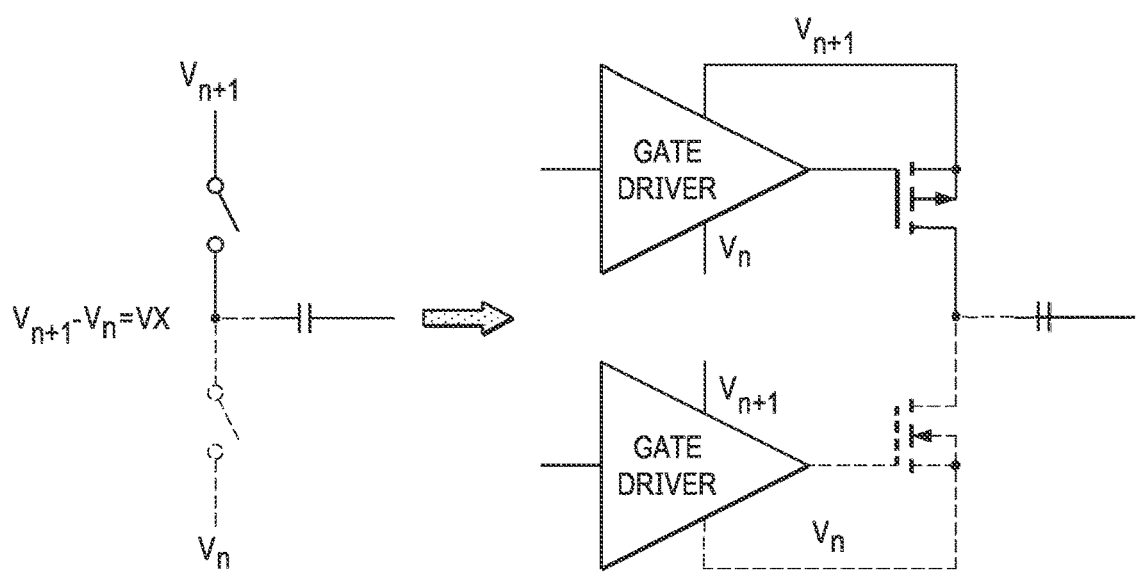
FIG. 3 is a schematic of a transistor-level representation of a pair of switches.
Figure 16:
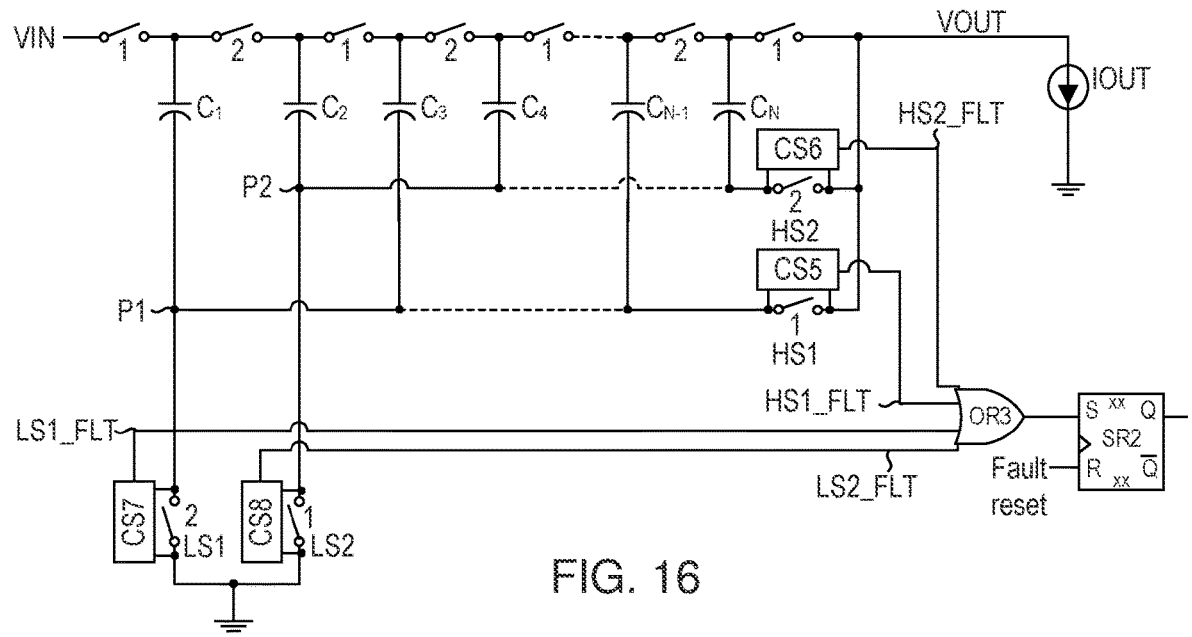
FIG. 16 is a schematic including a step-down charge pump with fault detection circuitry.

FIG. 16 illustrates a step-down charge pump 50 with fault detection circuitry to detect an outer capacitor open terminal connection in the middle of operation. An outer capacitor is defined herein as the capacitor closest to the input voltage VIN or the output voltage VOUT. Whenever a charge pump has two or fewer capacitors as shown in FIGS. 1A-1B, all the capacitors are outer capacitors.

Charge pump 50 has N capacitors, $C_1$ to $C_N$, where N is an even integer number. The odd-numbered capacitors $C_1$, $C_3$, ... $C_{N-1}$ share a first phase node P1 and the even-numbered capacitors $C_2$, $C_4$, ... $C_N$ share a second phase node P2. The first and second high-side switches HS1, HS2 couple the first and second phase nodes P1, P2 to the output voltage VOUT, respectively. Similarly, the first and second low-side switches LS1, LS2 couple the first and second phase nodes P1, P2 to ground, respectively. In this example, the outer capacitors are $C_1$ and $C_N$. The load at the charge pump 50 output is a current source IOUT, which enables the charge transfer between the capacitors to take place via a smooth and steady charging current proportional to IOUT, in a process described as soft charging.

During normal steady-state operation with soft charging, the currents through the conducting phase switches in each state are equal in magnitude. For instance in a first state, the first high-side switch HS1 and the second low-side switch LS2 conduct current wherein both switches carry the same magnitude of current. Likewise in a second state, the second high-side switch HS2 and the first low-side switch LS1 conduct current wherein both switches carry the same magnitude of current.

If one terminal of either outer capacitor $C_1$ or $C_N$ is disconnected in the middle of operation, the following occurs for several switching cycles before the charge pump output eventually collapses: the phase node currents become unbalanced in every other state or the current magnitude through one conducting high-side switch no longer matches the current magnitude through the other simultaneously conducting low-side switch. This fault can then be detected by simultaneously sensing and comparing the phase node switch currents during each state, and generating a logic flag whenever the current magnitudes become mismatched by more than a predefined offset. To avoid false positives, this logic flag should be set only if the current mismatch exceeds the predefined offset in at least multiple consecutive cycles, and the predefined offset should be large enough to ignore non-fault mismatches that can arise from mismatches in the outer capacitor values.

FIG. 16 also shows four current sensing and comparator circuits, CS5, CS6, CS7, CS8; each across one of the four phase switches. The particular implementation of each current sensing and comparator circuit is similar to that in FIG. 14 or FIG. 15. To detect a mismatch between the high-side and low-side switch currents in each state, one of the FIG. 14 or FIG. 15 voltage thresholds VTH1 or VTH2 can be designed to be a function of the switch current in that state. For example in the first state when the first high-side switch HS1 and the second low-side switch LS2 conduct, the voltage threshold VTH1 in the current sensing and comparator circuit CS5 should be proportional to the current magnitude of the low-side switch LS2, in order to sense the current mismatch magnitude between high-side switch HS1 and low-side switch LS2. Similarly in the second state when the second high-side switch HS2 and the first low-side switch LS1 conduct, the voltage threshold VTH1 in the current sensing and comparator circuit CS6 should be proportional to the current magnitude of the low-side switch LS1, in order to sense the current mismatch magnitude between high-side switch HS2 and low-side switch LS1.

The proportion of the phase switch current magnitude used to generate the voltage threshold VTH1 determines the predefined offset by which an open outer capacitor terminal fault can be detected and differentiated from non-fault mismatches. In addition, the comparator CP1 should have a symmetrical input offset or hysteresis, or be a window comparator in order to detect a bidirectional current mismatch.

Figure 17:
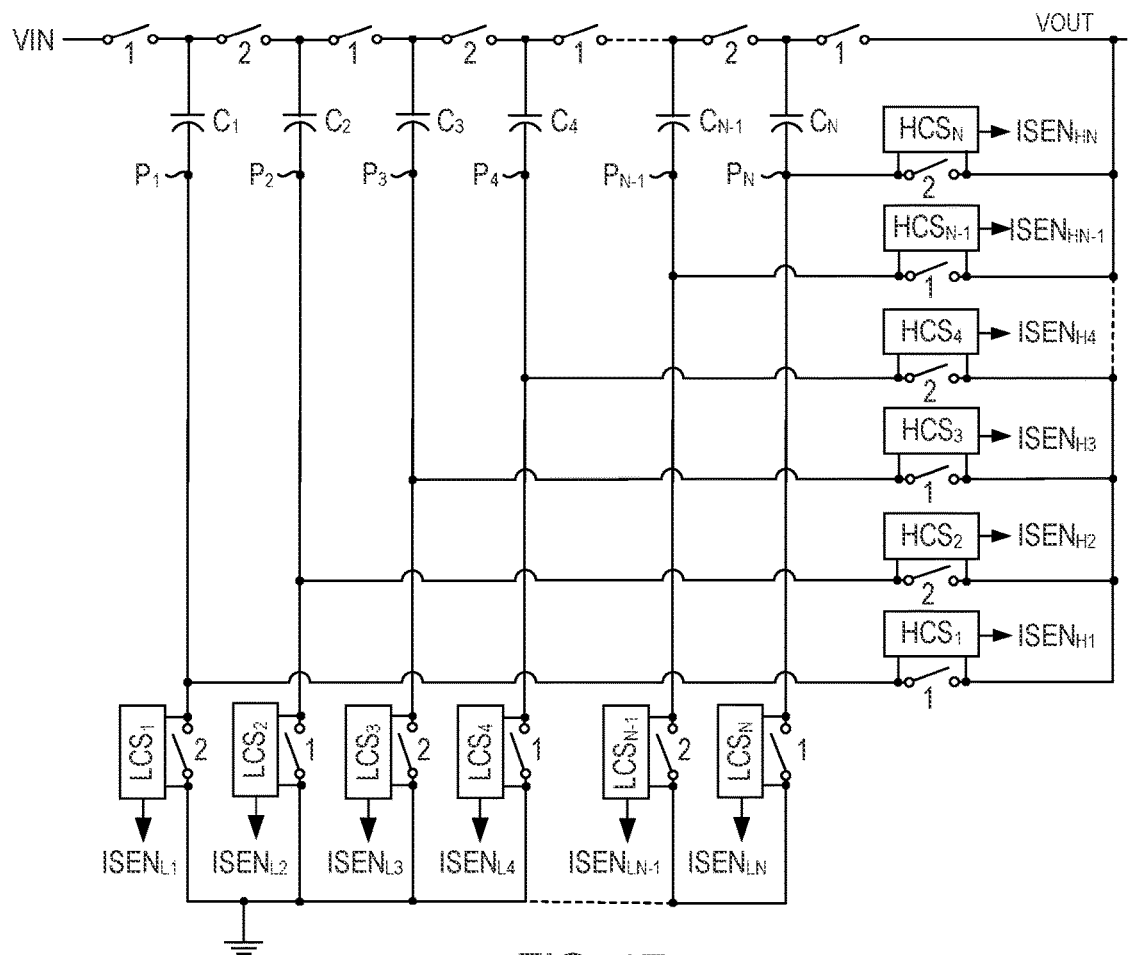
FIGS. 17-20 are a schematics each including a missing or open terminal fault detector.

An example of a missing or open capacitor terminal fault detector can also be applied to a charge pump where the phase nodes and switches are not shared by the common-state capacitors, such as charge pump 60A shown in FIG. 17. Like charge pump 50A, there are N capacitors, $C_1$ to $C_N$, in charge pump 60A where N is an even integer number. Each capacitor has its own pair of phase switches that connect the capacitor negative terminal between ground and the output voltage VOUT. There are altogether N high-side switches and N low-side switches, instead of just 2 high-side switches and 2 low-side switches for the charge pumps in FIGS. 13 and 16. Across each phase switch is a current sensing circuit, shown in FIG. 17 as $HCS_1$ to $HCS_N$ for the high-side switches and $LCS_1$ to $LCS_N$ for the low-side switches. The phase node current sensing scheme now applies to a greater number of switches at the expense of die area and quiescent current, but provides much more information on the current through each capacitor and wider fault coverage. In this case, an open capacitor terminal fault can be detected in any of the capacitors, not just the outer capacitors, by flagging a per-capacitor current level that is practically zero or significantly lower than that of the other capacitor current levels.

Figure 18:
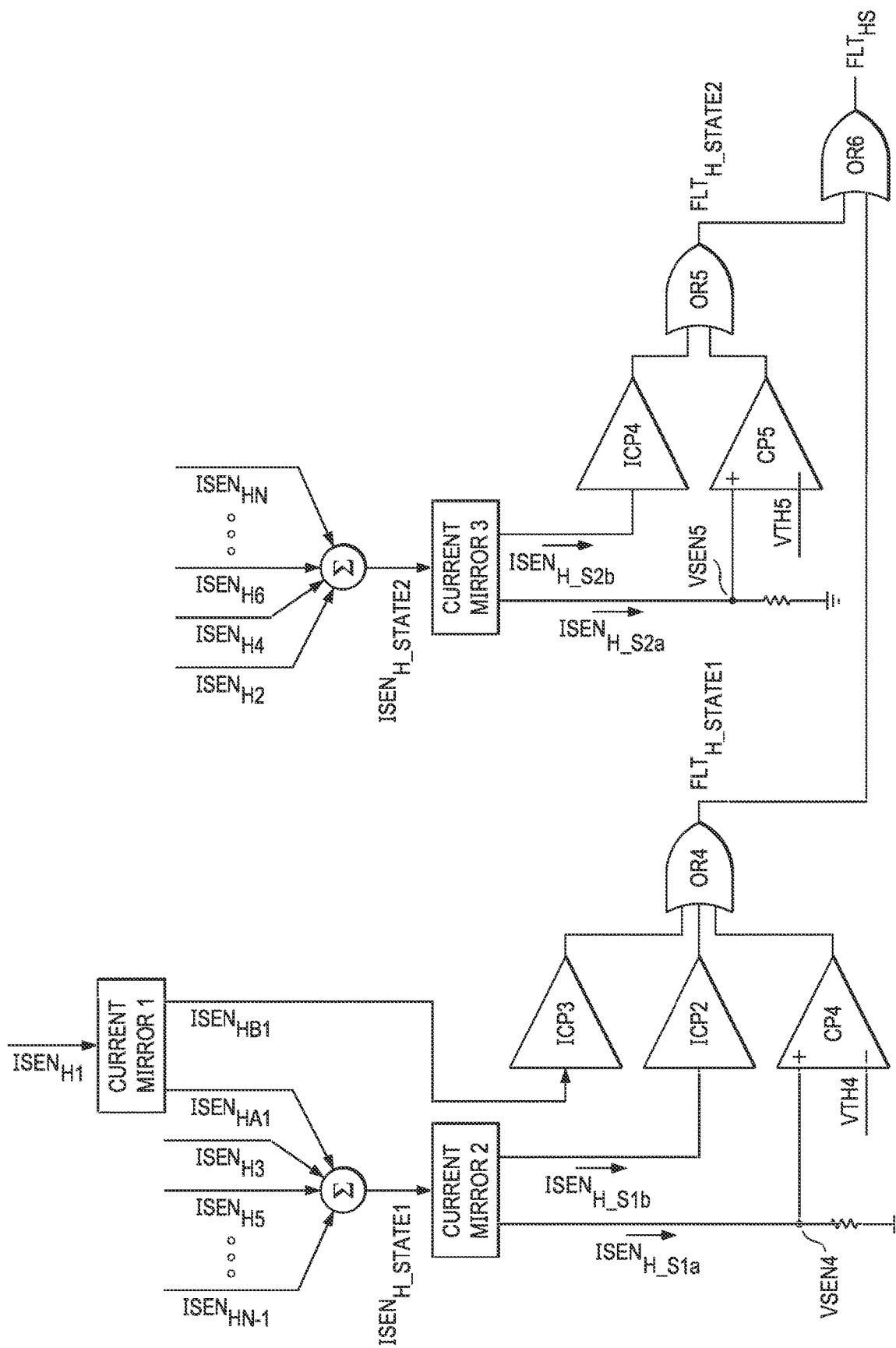

FIG. 18 shows a particular implementation of the fault detector for the high-side switches in FIG. 17. The current sensing circuit across each phase switch can be implemented using the circuits in either FIG. 12A or FIG. 12B. As previously described, the output of each current sensing circuit is a current that represents the magnitude and polarity of the corresponding switch current. In FIG. 18, the current output of the first high-side switch current sensing circuit $HCS_1$ is first replicated into two current copies, $ISEN_{HA1}$ and $ISEN_{HB1}$, using a current mirror or a current amplifier. The remaining current outputs of the odd-numbered high-side switch current sensing circuits HCS3, $HCS_5$ ... $HCS_{N-1}$ are summed together with $ISEN_{HA1}$ to generate a total high-side switch current for the first state, $ISEN_{H\_STATE1}$, that is equivalent to the high-side switch HS1 current in FIG. 16. $ISEN_{H\_STATE1}$ can then be replicated using a second current mirror or current amplifier to implement the comparator schemes previously described in FIGS. 4B-4C to sense fault events that cause a switch current magnitude and polarity change. $ISEN_{HB1}$ is used to detect a missing or open terminal fault at capacitor $C_1$ since the current magnitude through the first high-side switch and by extension that of $ISEN_{HB1}$ will decrease to zero upon the fault: by connecting $ISEN_{HB1}$ to the input of a current comparator ICP3, the comparator output logic level will be high if $ISEN_{HB1}$ is detected to be close to zero, and low if $ISEN_{HB1}$ is on the same order of magnitude as the other current outputs $ISEN_{H1}$, $ISEN_{H3}$, $ISEN_{H5}$ ... $ISEN_{HN-1}$.

Similarly in the second state, FIG. 18 shows the current outputs of the even-numbered high-side switch current sensing circuits $HCS_2$, $HCS_4$ ... $HCS_N$ summed together to generate a total high-side switch current for the second state $ISEN_{H\_STATE2}$, that is equivalent to the high-side switch HS2 current in FIG. 16. The resulting fault detection implementation using $ISEN_{H\_STATE2}$ is then similar to that used for $ISEN_{H\_STATE1}$, and the individual logic fault signals for each state can be logically combined in an OR operation.

Figure 19:
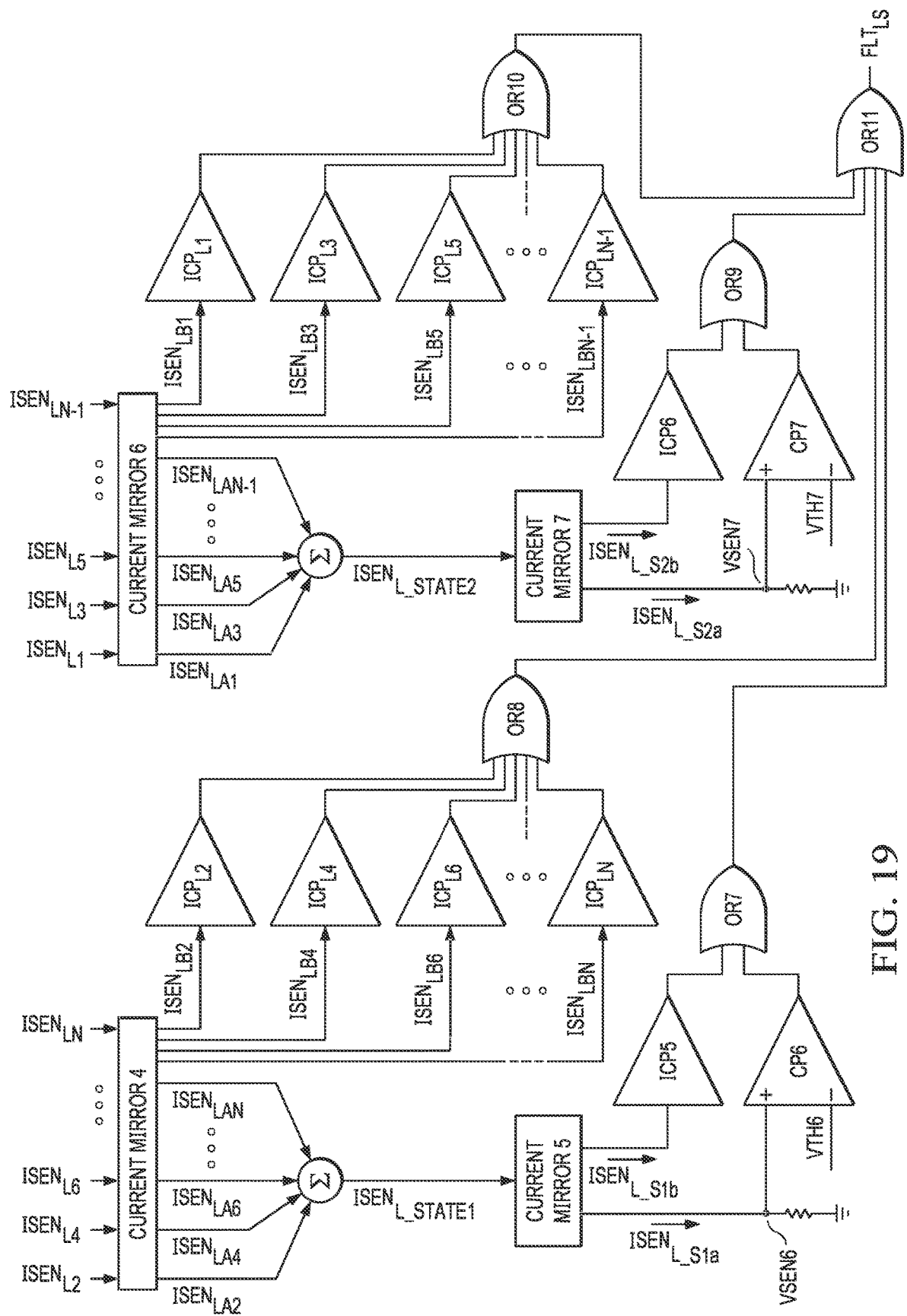

FIG. 19 shows a particular implementation of the fault detector for the low-side switches in FIG. 17. The current outputs of the even-numbered low-side switch current sensing circuits $LCS_2$, $LCS_4$, $LCS_6$, ... $LCS_N$ are first replicated into two copies using a current mirror or a current amplifier during the first state. During the second state, the current outputs of the odd-numbered high-side switch current sensing circuits $LCS_1$, $LCS_3$, $LCS_5$ ... $LCS_{N-1}$ are similarly replicated using a current mirror or a current amplifier. For either state of operation, the first set of copied currents corresponding to each state ($ISEN_{LA2}$, $ISEN_{LA4}$, $ISEN_{LA6}$ ... $ISEN_{LAN}$ in the first state; $ISEN_{LA1}$, $ISEN_{LA3}$, $ISEN_{LA5}$ ... $ISEN_{LAN-1}$ in the second state) are summed together to generate a total low-side switch current, $ISEN_{L\_STATE1}$ and $ISEN_{L\_STATE2}$, that is equivalent to the current in the FIG. 5 low-side switches LS2 and LS1 respectively. The comparator schemes previously described in FIGS. 14-15 can then be applied using $ISEN_{L\_STATE1}$ and $ISEN_{L\_STATE2}$.

The missing or open capacitor terminal fault detector is slightly different from that used for the high-side switches as illustrated previously in FIG. 18. The second set of replicated currents corresponding to each state ($ISEN_{LB2}$, $ISEN_{LB4}$, $ISEN_{LB6}$ ... $ISEN_{LBN}$ in the first state; $ISEN_{LB1}$, $ISEN_{LB3}$, $ISEN_{LB5}$ ... $ISEN_{LBN-1}$ in the second state) are each connected to current comparators $ICP_{L1}$ to $ICP_{LN}$ to detect a missing or open terminal fault at any capacitor, by detecting when the current magnitudes are at or close to zero. This zero-current detector can actually be used for the high-side switch implementation (FIG. 18) as well but it is unnecessary to use the zero-current detector for all the high-side and low-side switches since the FIG. 17 capacitors $C_2$ to $C_N$ are always connected in series with a low-side switch in both the first and second states; only the outer capacitor $C_1$ is not connected in series with a low-side switch during the first state. Therefore, a zero-current detector for only the first high-side switch is required as shown by the current comparator ICP3 in FIG. 18. Conversely, the FIG. 17 capacitors $C_1$ to $C_{N-1}$ are always connected in series with a high-side switch in both the first and second states; only the outer capacitor $C_N$ is not connected in series with a high-side switch during the first state. As an example, FIGS. 18-19 shows the zero-current detector used for all the low-side switches and just the first high-side switch connected to capacitor $C_1$, with both implementations together able to detect a missing or open terminal fault at any capacitor in the FIG. 17 charge pump, and not just at the outer capacitors.

Figure 20:
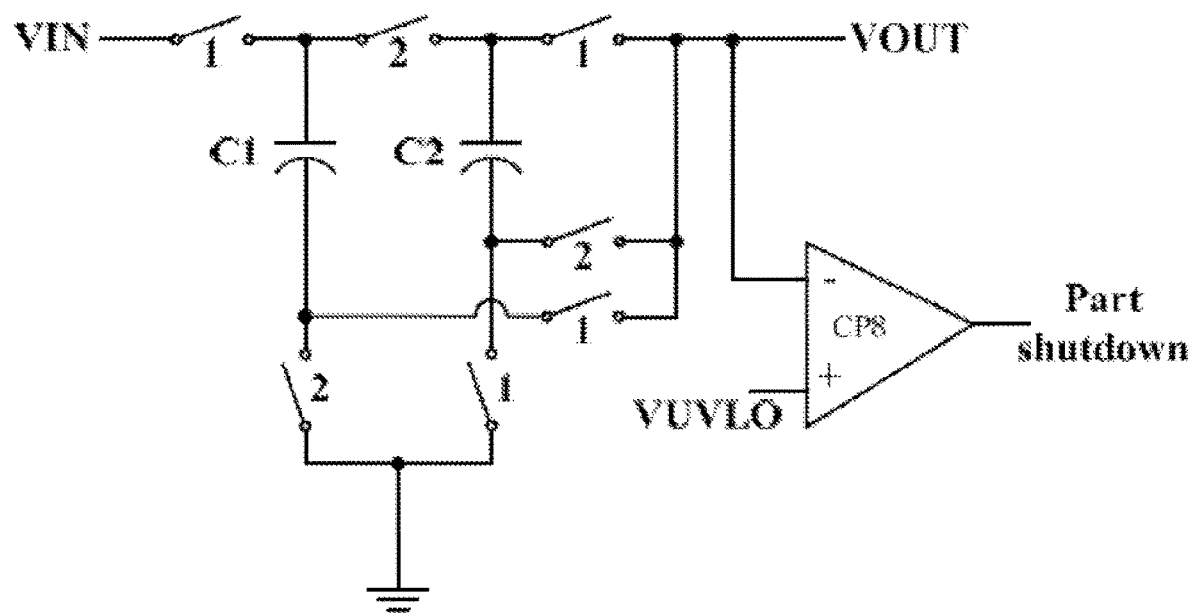

FIG. 20 shows an alternate method to detect a missing or open capacitor terminal fault at any capacitor for the charge pump in FIG. 1A, although this method can also be applied in the same fashion to the charge pumps in FIG. 1B, FIG. 16 and FIG. 17. One advantage of this method is that the charge pump does not have to be operated with soft charging for the fault detector to work. Upon the occurrence of a missing or open capacitor terminal fault event, either in the middle of charge pump operation or before charge pump operation begins, the charge pump will not be able to regulate the output VOUT to the target set by the charge pump conversion ratio and VOUT droops lower over consecutive switching cycles. By comparing the VOUT voltage level against a voltage threshold VUVLO using a voltage comparator CP8, the output of voltage comparator CP8 can be used as a logical fault indicator that disables charge pump operation when VOUT droops below the voltage threshold VUVLO. The voltage threshold VUVLO should be set below the minimum operating VOUT level in the application, including the largest VOUT ripple amplitude that would occur across the application space but above a level where basic transistor functionality would fail or degrade to a point that would adversely affect the performance of the charge pump and/or a subsystem connected in series with VOUT. The voltage threshold VUVLO can be a fixed voltage level or variable as a function of the VOUT voltage level and the VOUT ripple amplitude, if such information was available to the charge pump through sensed inputs or internally programmed settings. For instance, the charge pump switching frequency and capacitor values could be internally programmed settings and these settings directly govern the VOUT ripple amplitude.

6 Implementations

Implementations of the approaches described above may be integrated into monolithic devices, using integrated and/or external (e.g., discrete) capacitors. Control logic for detecting and processing of the detected states may be integrated fully on the device, or may be implemented at least in part using external circuitry. This integrated and/or external circuitry can use dedicated logic circuitry (e.g., application specific integrated circuits, ASICs) and/or software implemented logic including a controller, processor, or some other software controlled element. Such software may be stored on a tangible machine-readable medium (e.g., semiconductor memory, optical disk, etc.). Instructions for controlling at least some stage of design or fabrication of a device implementing an approach described above may also be stored on a tangible machine-readable medium.

It is to be understood that the foregoing description is intended to illustrate and not to limit the scope of the invention, which includes the scope of the appended claims. Other embodiments are within the scope of the following claims.

What is claimed is:

1. An integrated circuit (IC) for use with a voltage converter, comprising:
   a fault detector, the fault detector capable to detect one or more fault events during operation of the voltage converter and generate one or more fault signals with respect to the one or more to be detected fault events;
   wherein the voltage converter to comprise at least a set of switches and a set of capacitors arranged to form a configuration such that at least some of the switches operate in a manner to form an electrical connection of at least some of the capacitors to respective alternate voltages in successive stages of operation of the voltage converter, and
   wherein the voltage converter to comprise a disconnect switch to have a drain-to-source (DS) voltage rating greater than an input voltage of the voltage converter and greater than a DS voltage rating of at least one switch in the set of switches;
   wherein the one or more fault signals to signal the disconnect switch to electrically disconnect through at least one switch in the set of switches.

2. The IC of claim 1, wherein the respective alternate voltages comprise ground and an output voltage level.

3. The IC of claim 1, wherein the successive stages of operation of the voltage converter to comprise two alternating clocked phases of operation of the voltage converter to be driven in a non-overlapping manner.

4. The IC of claim 1, wherein the one or more fault events comprising at least one of the following to be detected by the fault detector at a terminal or at a node of the voltage converter: a voltage above an overvoltage threshold, a voltage below an undervoltage threshold and/or a current above an overcurrent threshold.

5. The IC of claim 4, wherein the overvoltage threshold, the undervoltage threshold and/or the overcurrent threshold comprise programmable settings.

6. The IC of claim 4, wherein the fault detector comprises a voltage comparator and/or a current comparator to detect at least one of the following: the voltage above the overvoltage threshold, the voltage below the undervoltage threshold and/or the current above the overcurrent threshold.

7. The IC of claim 6, wherein the fault detector includes a logical fault indicator to generate the one or more fault signals based at least in part on one or more signals from the voltage comparator and/or the current comparator.

8. The IC of claim 7, wherein at least one of the one or more fault signals to be generated to comprise a latched fault signal.

9. The IC of claim 1, wherein the DS voltage ratings comprise DS voltage breakdown ratings.

10. The IC of claim 1, wherein the disconnect switch is included in the set of switches and the disconnect switch to have a drain-to-source (DS) voltage rating greater than a DS voltage rating of at least one other switch in the set of switches.

11. An apparatus comprising:
a voltage converter and a fault detector,
the voltage converter to comprise at least a set of switches and a set of capacitors arranged to form a configuration such that at least some of the switches operate in a manner to form an electrical connection of at least some of the capacitors to respective alternate voltages in successive stages of operation of the voltage converter;
the voltage converter to comprise a disconnect switch to have a drain-to-source (DS) voltage rating greater than an input voltage of the voltage converter and greater than a DS voltage rating of at least one switch in the set of switches;
the fault detector capable to detect one or more fault events during operation of the voltage converter and generate one or more fault signals with respect to the one or more to be detected fault events; and
the one or more fault signals to signal the disconnect switch to electrically disconnect at least one switch of the set of switches.

12. The apparatus of claim 11, wherein the DS voltage ratings comprise DS voltage breakdown ratings.

13. The apparatus of claim 12, wherein the respective alternate voltage levels comprise ground and an output voltage level and wherein the successive stages of operation of the voltage converter to comprise two alternating clocked phases of operation of the voltage converter to be driven in a non-overlapping manner.

14. The apparatus of claim 12, wherein the one or more fault events comprising at least one of the following to be detected by the fault detector at a terminal or at a node of the voltage converter: a voltage above an overvoltage threshold, a voltage below an undervoltage threshold and/or a current above an overcurrent threshold.

15. The apparatus of claim 14, wherein the overvoltage threshold, the undervoltage level and/or the overcurrent threshold comprise programmable settings.

16. The apparatus of claim 14, wherein the fault detector comprises a voltage comparator and/or a current comparator to detect at least one of the following: the voltage above the overvoltage threshold, the voltage below the undervoltage threshold and/or the current above the overcurrent threshold.

17. The apparatus of claim 16, wherein the fault detector includes a logical fault indicator to generate the one or more fault signals based at least in part on one or more signals from the voltage comparator and/or the current comparator.

18. The IC of claim 1, wherein upon detecting one or more fault events, the fault detector is to cause suspension of operation of the voltage converter.

19. The IC of claim 18, wherein the operation comprises a clocked operation.

20. The IC of claim 1, wherein upon detecting one or more fault events, the fault detector is to cause changing a logic state of one or more internal bits.

21. The IC of claim 1, wherein upon detecting one or more fault events, the fault detector is to cause restarting the voltage converter.

22. The IC of claim 21, wherein restarting the voltage converter comprises executing a startup operation sequence.

23. The IC of claim 1, wherein the one or more fault events comprising at least one of the following to be detected by the fault detector of the voltage converter: a magnitude of a current flow polarity above a threshold.

24. The IC of claim 23, wherein when the fault detector detects the magnitude of the current flow polarity above the threshold, the fault detector is to cause at least one switch of the set of switches to turn off.

25. The apparatus of claim 11, wherein upon detecting one or more fault events, the fault detector is to cause suspension of operation of the voltage converter.

26. The apparatus of claim 25, wherein the operation comprises a clocked operation.

27. The apparatus of claim 11, wherein upon detecting one or more fault events, the fault detector is to cause changing a logic state of one or more internal bits.

28. The apparatus of claim 11, wherein upon detecting one or more fault events, the fault detector is to cause restarting the voltage converter.

29. The apparatus of claim 28, wherein restarting the voltage converter comprises executing a startup operation sequence.

30. The apparatus of claim 11, wherein the one or more fault events comprising at least one of the following to be detected by the fault detector of the voltage converter: a magnitude of a current flow polarity above a threshold.

* * * * *

UNITED STATES PATENT AND TRADEMARK OFFICE
CERTIFICATE OF CORRECTION

| | |
|---|---|
| PATENT NO. | : 11,901,817 B2 |
| APPLICATION NO. | : 18/348924 |
| DATED | : February 13, 2024 |
| INVENTOR(S) | : Aichen Low et al. |

It is certified that error appears in the above-identified patent and that said Letters Patent is hereby corrected as shown below:

In the Claims

Claim 1, Column 18, Lines 38-40, "wherein the one or more fault signals to signal the disconnect switch to electrically disconnect through at least one switch in the set of switches" should read --wherein the one or more fault signals to signal the disconnect switch to electrically disconnect at least one switch in the set of switches--.

Signed and Sealed this
Ninth Day of April, 2024

Katherine Kelly Vidal
*Director of the United States Patent and Trademark Office*